United States Patent [19]

Chalmers

[11] Patent Number: 5,375,146
[45] Date of Patent: Dec. 20, 1994

[54] DIGITAL FREQUENCY CONVERSION AND TUNING SCHEME FOR MICROWAVE RADIO RECEIVERS AND TRANSMITTERS

[75] Inventor: Harvey Chalmers, Rockville, Md. 20853

[73] Assignee: Comsat Corporation, Bethesda, Md.

[21] Appl. No.: 57,573

[22] Filed: May 6, 1993

[51] Int. Cl.$^5$ ............................................. H04B 1/10
[52] U.S. Cl. .................................... 375/103; 375/97; 364/724.1
[58] Field of Search ........................ 375/10, 82, 84, 96, 375/97, 103, 104; 329/304, 306, 308, 318, 319, 322, 323; 364/724.1, 724.11, 724.13; 455/164.1, 164.2, 165.1, 192.2, 208, 307

[56] References Cited

U.S. PATENT DOCUMENTS

| | | | |
|---|---|---|---|
| 4,117,541 | 9/1978 | Ali | 364/724.17 |
| 4,138,730 | 2/1979 | Ali | 364/726 |
| 4,241,443 | 12/1980 | Sakaki et al. | 370/70 |
| 4,312,062 | 1/1982 | Bellanger et al. | 370/50 |
| 4,316,282 | 2/1982 | Macina | 370/70 |
| 4,636,972 | 1/1987 | Boland | 364/714.18 |
| 4,737,728 | 4/1988 | Nakamura et al. | 329/110 |
| 4,859,960 | 8/1989 | Standford et al. | 329/341 |
| 4,884,265 | 11/1989 | Schroeder et al. | 370/70 |
| 4,910,469 | 3/1990 | Takahashi | 329/320 |
| 5,023,940 | 6/1991 | Johnson et al. | 375/103 |
| 5,077,531 | 12/1991 | Takeuchi et al. | 329/304 |
| 5,142,553 | 8/1992 | Rosenkranz | 375/75 |
| 5,157,395 | 10/1992 | Del Signore et al. | 364/724.1 |
| 5,172,070 | 12/1992 | Hiraiwa et al. | 329/304 |
| 5,220,583 | 6/1993 | Solomon | 375/82 |
| 5,278,782 | 1/1994 | Greenberg | 375/103 |

OTHER PUBLICATIONS

H. Chalmers, "A Digital Frequency Scheme for High Frequency SCPC Channel Units Requiring Precise Tuning and Low Phase Noise", Comsat Laboratories Technical Note CTD-92/127, Jul. 1992.
Analog Devices Inc., "Analog-Digital Conversion Handbook", Prentice-Hall, Englewood Cliffs, N.J., 1986, p. 376.
S. Jantzi et al., "Bandpass Sigma-Delta Analog-to-Digital Conversion", IEEE Transaction on Circuits and Systems, vol. 38, No. 11, Nov., 1991, pp. 1406–1409.
B. Xenakis and Alklan Evans, "Vehicle Locator Uses Spread-Spectrum Technology", RF Design, Oct., 1992, pp. 58, 60, 62–65.
J. Brown, "Low-Power Source Achieves Oven-Like Frequency Stability", Microwaves & RF, Jun., 1990.
D. Chester and G. Phillips, "Single Chip Digital Down Converter Simplifies RF DSP Applications", RF Design, Nov., 1992.
C. Olmstead and M. Petrowski, "A Digital Tuner for Wideband Receivers", DSP Applications, Sept., 1992, pp. 1–7.

*Primary Examiner*—Stephen Chin
*Assistant Examiner*—Young Tse
*Attorney, Agent, or Firm*—Sughrue, Mion, Zinn, Macpeak & Seas

[57] ABSTRACT

A digital frequency upconversion and downconversion scheme for receivers and transmitters enables high resolution downconversion and upconversion, respectively, with low phase noise. A digital signal processor (DSP) receives temperature measurement information from a temperature transducer associated with a reference oscillator, and also receives channel tuning and other information. The DSP adjusts the signal samples accordingly, without adjusting the operation of the oscillator. Additionally, the inventive filtering scheme, preferably implemented in an application specific integrated circuit (ASIC), receives digital filtering coefficient information, digital symbol timing phase control signals, and, in some cases, other information from the DSP. As a result, the scheme enables operation at 1 Hz resolution, with phase noise which is at least 33.5 dB down at 10 Hz in the case of downconversion, and at least 42 dB down at 10 Hz in the case of upconversion.

19 Claims, 22 Drawing Sheets

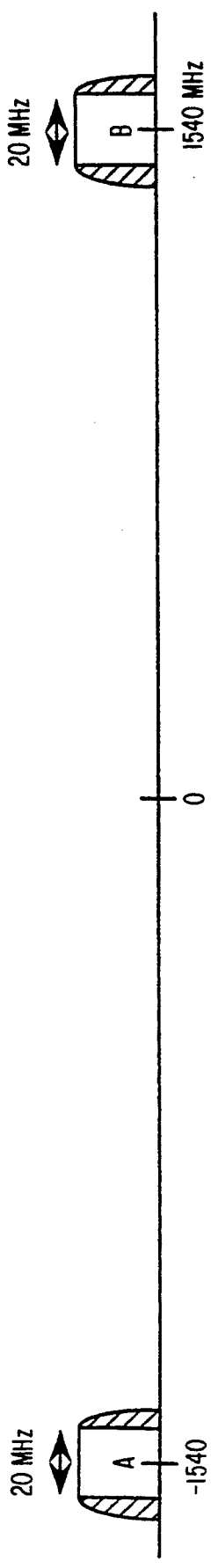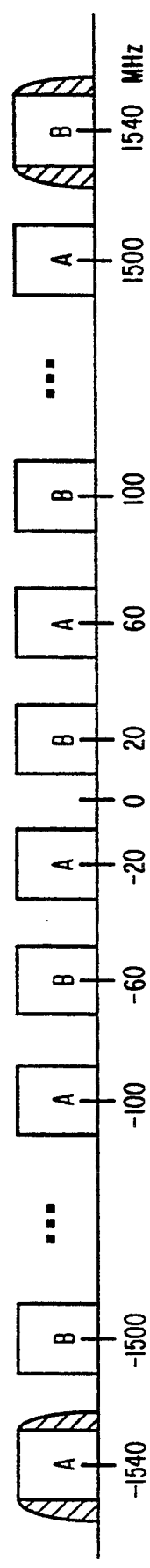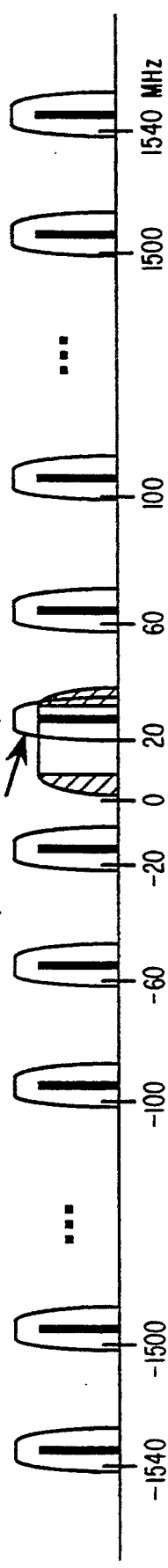

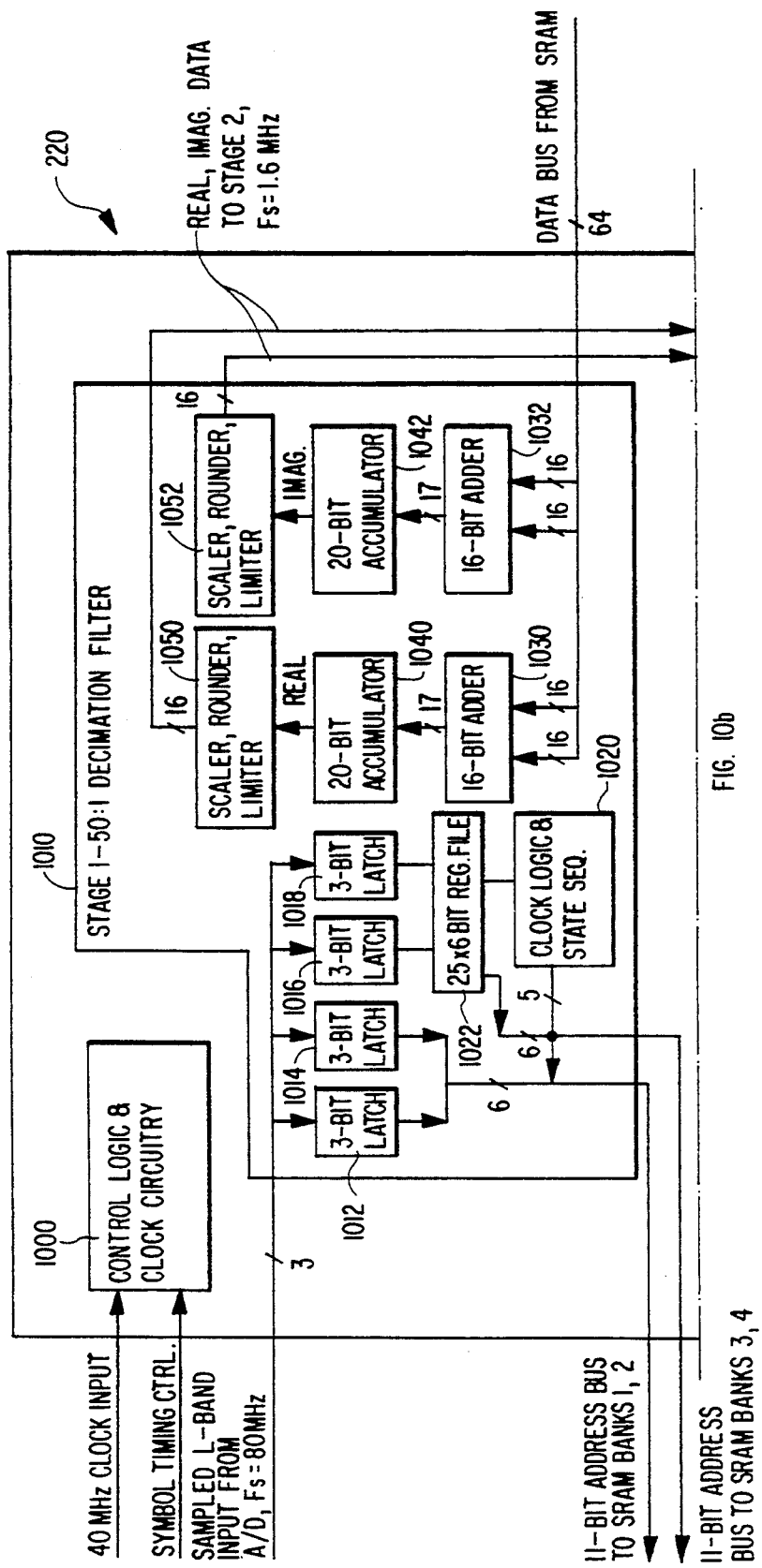

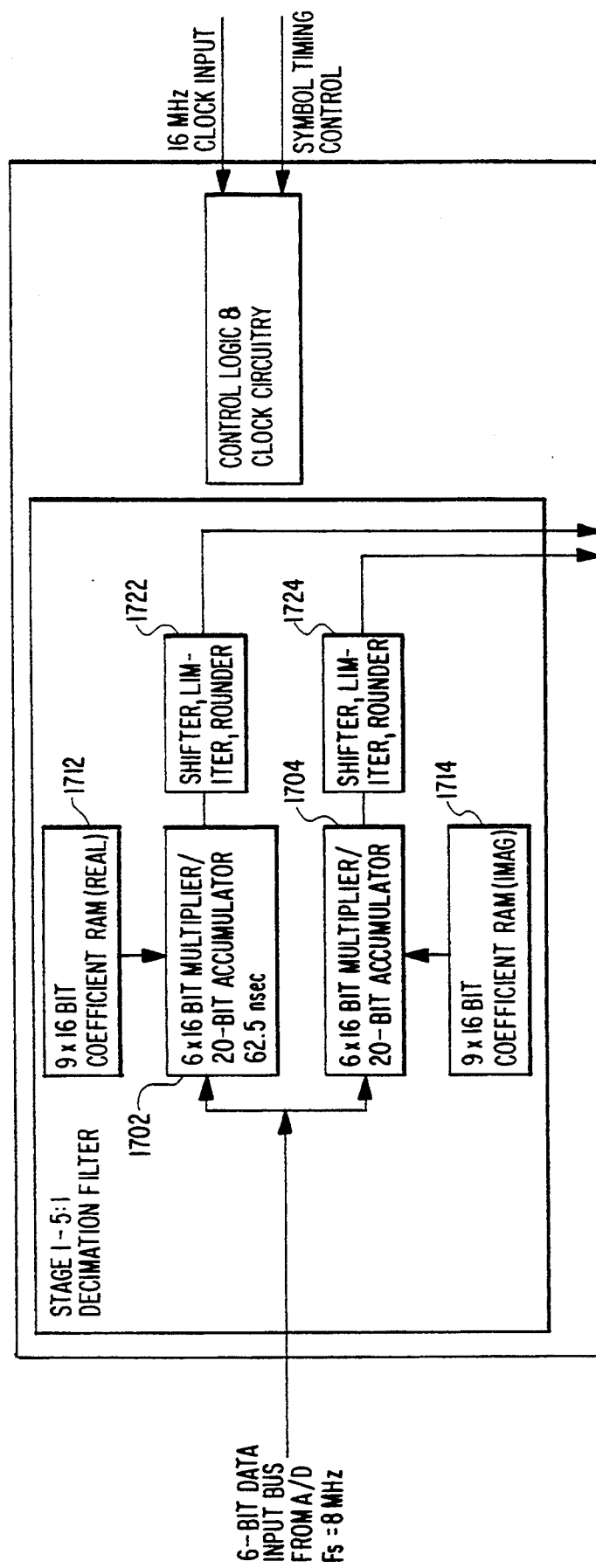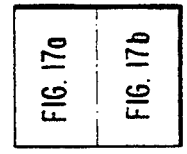

DIGITAL FREQUENCY CONVERSION AND TUNING SCHEME FOR MICROWAVE RADIO RECEIVERS AND TRANSMITTERS

BACKGROUND OF THE INVENTION

The present invention relates to a method of and an apparatus for effecting frequency translation at microwave frequencies, and in particular to a frequency translation scheme which works at L-band, using an analog-to-digital sampling scheme which enables elimination of multiple-step mixer/local oscillator circuitry at the front end. The invention contemplates applicability to both reception (downconversion) and transmission (upconversion) at frequencies of 2 GHz or less.

FIG. 1 shows a block diagram of a typical frequency-tunable RF-to-baseband downconverter, employing a triple analog conversion scheme with a quadrature third conversion stage. An L-band filter 102 filters an L-band RF input from a low noise amplifier (LNA). A first amplifier 104 receives the filtered output of the filter 102 and provides an amplified output to a first mixer 106, which also receives an output of a fixed local oscillator (LO) 120. The output of mixer 106 is provided to a first intermediate frequency (IF) filter 108, whose output is provided to a second amplifier 110, which comprises a variable gain amplifier which is driven by an automatic gain control (AGC) signal derived from demodulator 150.

The output of amplifier 110 is provided to a second mixer 112, which also receives an output of a tunable LO 122. The output of mixer 112 is provided to a second IF filter 114, whose output in turn is provided to a third amplifier 116. The output of amplifier is provided to mixers 132, 134. Mixer 132 receives an output of fixed LO 124 which is 90° out of phase (via phase shifter 126) from the LO 124 output which is provided to mixer 134. A high-stability frequency reference oscillator 130 provides reference values to the respective LOs.

The respective outputs of mixers 132, 134 are filtered in baseband filters 136, 138, and converted in respective analog-to-digital (A/D) converters 140, 142. The outputs of A/D converters 140, 142, which are quadrature and in-phase values, respectively, are provided to a digital signal processor (DSP) based demodulator 150, which provides a demodulated output.

Variations employing different numbers of conversion stages also are known. In any event, each such conversion stage requires a mixer, an LO, and a filter to remove the undesired mixer products. A variable gain amplifier, which is placed in one of the stages for gain control, is driven by an AGC signal derived from the demodulator.

As shown in FIG. 1, the second conversion stage uses a tunable LO for channel selection. The third LO is split into its in-phase (I) and quadrature (Q) components. As a result, the final downconversion to baseband is complex, requiring two mixers and two lowpass filters. The I and Q baseband signals each are then sampled by an A/D converter. The resulting complex digital signal is sent to a digital signal processor for subsequent matched filtering, demodulation, carrier recovery, and bit detection.

Typically, each LO is phase-locked to a high-stability crystal frequency reference oscillator 130, as shown, in order to maintain a high degree of frequency tuning accuracy. Implementation of the tunable LO 122 is based on one of three methods:

i) Analog frequency synthesis, in which a signal at the desired frequency is obtained by controlling one or more analog phase locked loop (PLL) circuits. The exact number of loops required depends on the total tuning range, step size, and phase-noise performance.

ii) Direct digital synthesis (DDS), in which the sine (and cosine) waveform at the desired frequency is generated digitally and is converted to an analog signal with a digital-to-analog (D/A) converter.

iii) Hybrid analog PLL/DDS, in which the output of a DDS synthesizer is mixed with the outputs of one or more analog phase locked loops to give some of the advantages of both techniques.

A primary disadvantage resulting from the scheme shown in FIG. 1 is the large number of components required. The analog filters often are large, require precise component matching, and are difficult to incorporate into an integrated circuit. Other disadvantages include the following:

i) The reference oscillator 130 often requires an oven to maintain precise temperature control to minimize frequency drift. For low bit-rate phase shift keying (PSK) or quadrature amplitude modulation (QAM) systems, the total frequency error in the downconversion process must be much less than the transmission symbol rate in order to minimize losses in the demodulator matched filter and for the carrier tracking loop to acquire successfully.

ii) Analog frequency synthesizers are difficult to design for low phase noise, especially if a fine step size is required. The PLL loop bandwidth is directly proportional to the synthesizer step size. As the loop bandwidth is decreased, the loop is less able to track the extremely low phase distortion of the crystal reference oscillator accurately. A 1 Hz step size, which is desired, requires a large number of components, increasing system cost.

iii) DDS synthesizers exhibit low phase noise characteristics, but suffer from relatively high levels of spurious emissions. Performance is limited by the resolution and dynamic characteristics of the subsequent D/A converter. The maximum frequency available from a DDS synthesizer currently is limited to below 100 MHz, and thus is unsuitable for operation at L-band.

iv) Hybrid analog/digital synthesizers can achieve very low phase noise and extremely high frequency resolution, but again a large number of components is required.

v) Quadrature sampling requires an LO splitter with a precise 90° phase difference between the two channels. The two mixers, baseband filters, and A/D converters also must have precise phase and gain matching.

vi) The baseband filter must have a constant group delay versus frequency response and minimal passband gain ripple so as to minimize intersymbol interference. Typically, an equalization network is required.

vii) The use of multiple conversion stages requires careful construction techniques in order to avoid interference between stages. The mixers must be laid out so as to maximize the isolation between ports.

viii) The use of several stages of mixing and amplification often creates large DC offsets to the A/D converter. Typically either an analog nulling circuit preceding the A/D converter or a digital nulling algorithm following the A/D converter is required.

Other known approaches include the following.

U.S. Pat. Nos. 4,737,728, 5,142,553, and 5,172,070 disclose fixed-frequency receive-only schemes which have some of the disadvantageous, space-taking mixer-oscillator structure shown in FIG. 1. The '728 patent does not sample at RF frequencies. The '553 patent refers to an "HF" carrier signal, but is not specific as to the frequency of that signal. Sampling is carried out after two mixing stages which downconvert the signal to an IF frequency.

U.S. 4,884,265 discloses a receive-only scheme operating at frequencies well below L-band.

None of the aforementioned patents discloses an efficient temperature compensation scheme—an essential element in order to minimize frequency drift.

Other conventional techniques include those disclosed in the following U.S. Pat. Nos. 4,117,541; 4,138,730; 4,241,443; 4,312,062; 4,316,282; 4,636,972; 4,859,960; 4,910,469; and 5,077,531.

It would be desirable to implement a frequency conversion scheme which is tunable to different frequencies, which compensates efficiently for frequency drift without altering the operation of the reference oscillator, and which is applicable not only to reception but also to transmission, particularly at microwave frequencies (2 GHz and below). Such a system should operate at high resolution (preferably 1 Hz), and at low phase noise.

SUMMARY OF THE INVENTION

In view of the foregoing, it is one object of the present invention to provide a scheme for digitally sampling an analog RF bandpass signal directly at microwave frequencies (2 GHz and below) and downconverting it to baseband.

It is another object of the present invention to provide such a scheme for upconversion from baseband to microwave frequencies, for transmission.

It is yet another object of the present invention to provide a scheme for downconverting an analog RF bandpass signal, digitally sampling at an IF frequency, and then performing downconversion to baseband.

The inventive scheme, which eliminates the need for analog mixers, splitters, filters, local oscillators, and frequency synthesizers used in typical microwave receivers, is particularly well suited for implementation in a custom VLSI chip, as an application specific integrated circuit (ASIC). Frequency tuning for channel selection, as well as real-time frequency tracking to compensate for drift or Doppler shifts, are accomplished readily to a resolution on the order of 1 Hz across a 20 MHz RF bandwidth. A natural consequence of the digital downconversion process is that the digital output is complex, providing perfectly phase and gain matched in-phase and quadrature samples typically required for phase shift keying (PSK) and quadrature amplitude modulation (QAM) demodulators.

The method is particularly well suited to low bit-rate FDMA (frequency division multiple access) systems employing PSK or QAM modulation where phase noise and frequency offsets are a major concern. The method can be used in many applications where channelized transmissions are employed, including digital cellular telephone, satellite communications, and digital microwave radio. The elimination of all receiver local oscillators (and the frequency synthesizer in particular) removes the most common phase noise sources. Another important aspect of the invention relates to the digital compensation for the inherent frequency drift versus temperature of the reference oscillator.

The inventive technique is based on the ability to sample a bandpass signal at a rate of at least twice the bandwidth rather than the Nyquist criterion of at least twice the maximum signal frequency. In the present situation, bandwidth refers to the total frequency span of the receiver. For microwave receivers, this bandwidth is typically much less than the carrier frequency, permitting practical sampling rates to be used. After digital sampling, one of many narrow-band channels can be selected using a linear-phase, tunable digital bandpass filter. Tuning of the digital filter for channel selection is accomplished readily by pre-computing the filter coefficients in an external control processor (DSP) and downloading them to the filter. After filtering, the sample rate can be decimated to a much lower rate, and downconversion and frequency tracking can be accomplished using a digital frequency rotation at the lower sampling rate.

The digital filter is implemented in multiple stages, resulting in an extremely efficient design. The majority of the downconversion with channel tuning capability can be readily implemented in a single CMOS ASIC plus a separate static RAM memory. The final digital downconversion to baseband, including the frequency tracking mechanism, is implemented in a programmable DSP. However, the algorithm is efficient enough that it could be implemented in the same DSP that typically would be used to perform the digital demodulation functions.

The same techniques are also directly applicable to a digital upconverter for a microwave transmitter. In accordance with the present invention, the digital upconversion is to an IF frequency. The IF signal then is processed in a subsequent analog upconversion stage to RF.

In accordance with yet another embodiment of the invention, an analog downconversion stage is used to downconvert an L-band signal to IF frequencies, whereupon the above-mentioned ASIC/DSP combination is used to downconvert the IF signal the rest of the way to baseband. The filtering scheme in the ASIC can be simpler than in the first-described instance because of the analog downconversion stage.

BRIEF DESCRIPTION OF THE DRAWINGS

The foregoing and other objects, features, and advantages of the invention will be appreciated from the following detailed description, taken in conjunction with the accompanying drawings, in which:

FIGS. 4(a)–(h) are graphs of spectra of an L-band signal during various stages of downconversion in accordance with a first embodiment of the invention;

DETAILED DESCRIPTION OF THE PREFERRED EMBODIMENTS

Figure 1:
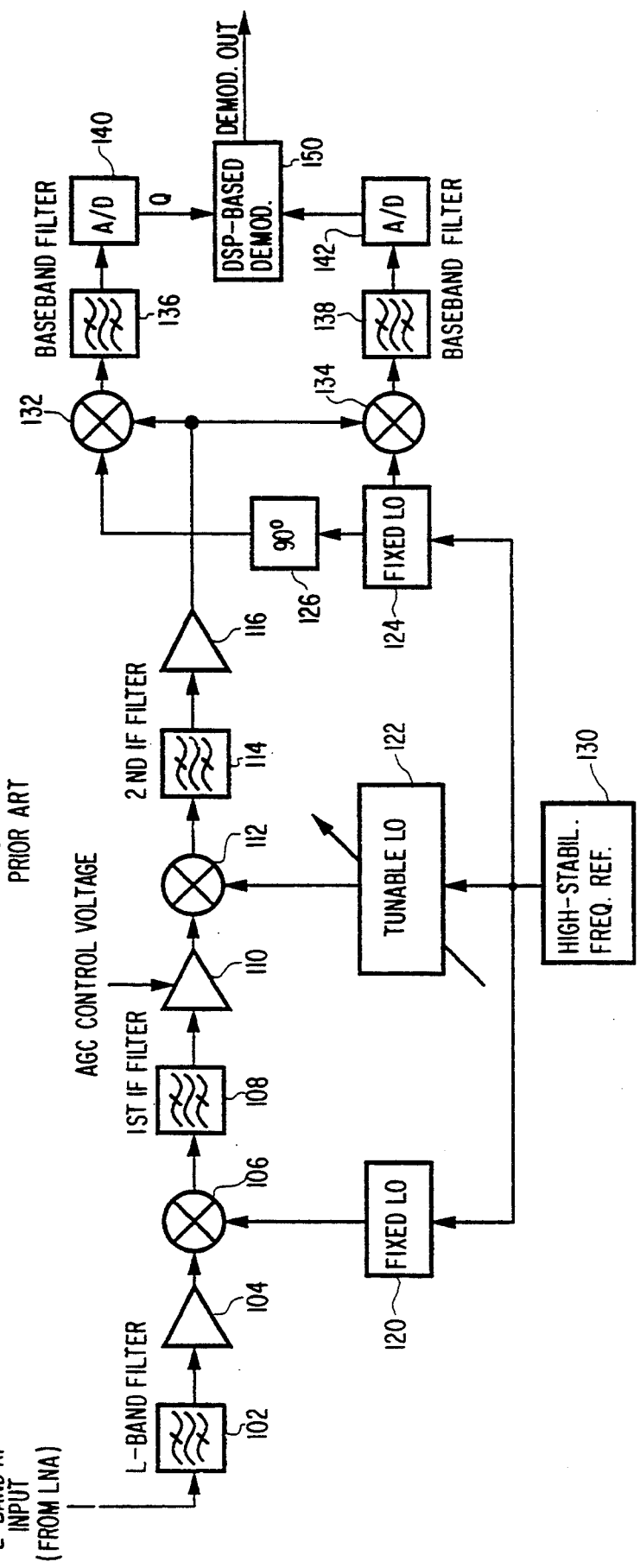
FIG. 1 is a block diagram of conventional L-band to baseband receiver architecture.
Figure 2:
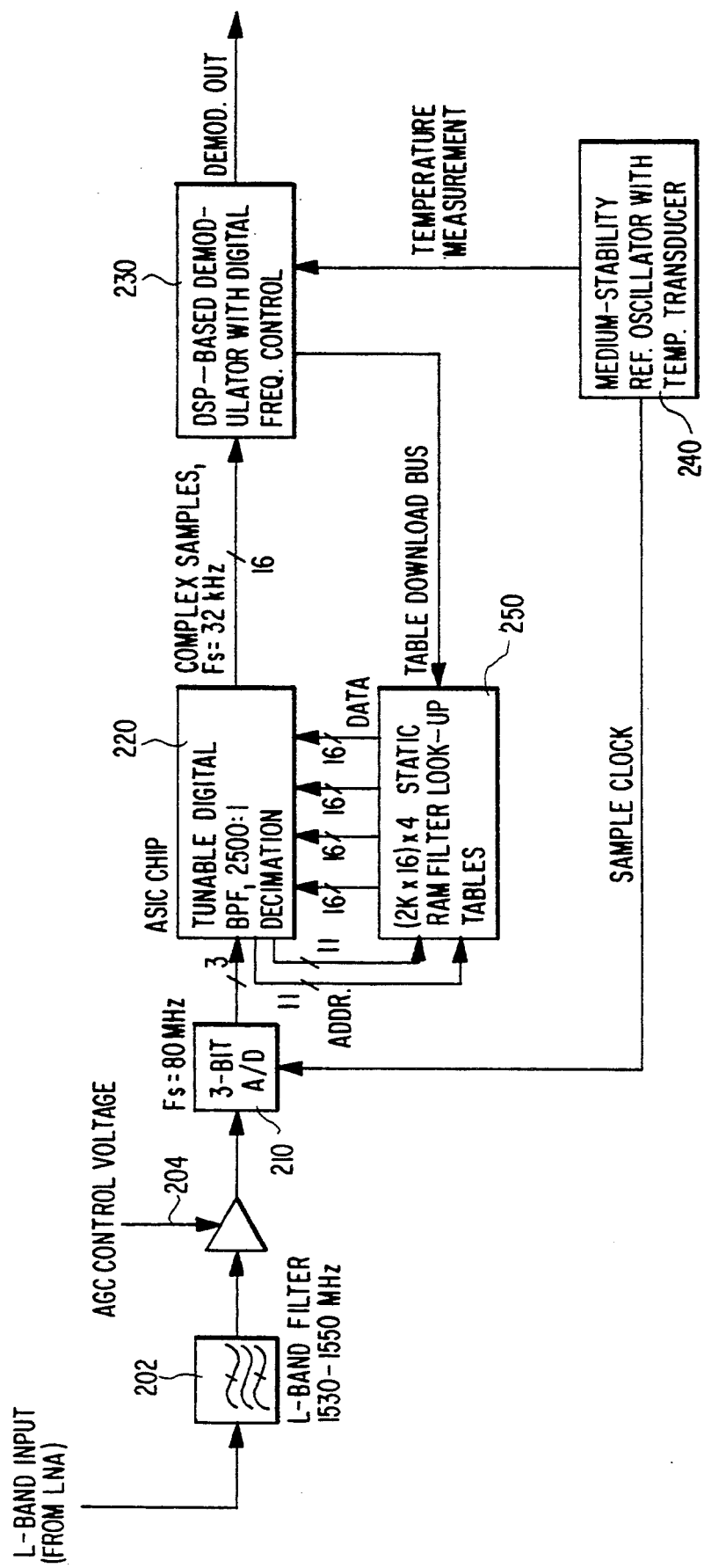
FIG. 2 is a block diagram of a first embodiment of the present invention.

A block diagram of the inventive digital downconverter is shown in FIG. 2. A detailed explanation is provided below. The highly integrated design should be noted. In accordance with this design, all analog components have been eliminated except for the RF input filter 202 and AGC amplifier 204. Sampling at RF is accomplished using an A/D converter 210 with a resolution of two or three bits. Tunable digital bandpass filter 220 is implemented in a single custom ASIC, plus a bank of static RAM memory 250. Frequency control is included as part of the DSP-based demodulator 230.

Looking more closely now at the embodiment of the invention as shown in FIG. 2, an L-band filter 202 receives an L-band input from an LNA. In the preferred embodiment, the passband of the filter 202 is 1520–1550 MHz, but the invention is not so limited. AGC amplifier 204 receives the output of filter 202. A/D converter 210, which in the preferred embodiment has a two or three bit resolution, receives the output of amplifier 204. The sampling rate of A/D converter 210 is 80 MHz in the preferred embodiment.

For an RF center frequency $f_c$, sample rate $f_s$, and two-sided signal bandwidth B, the following criteria must be met for ideal bandpass sampling:

$$f_s > 2B \quad [1]$$

$$f_s = \frac{4f_c}{2n+1} \quad [2]$$

where

B is a two-sided bandwidth; and n = any non-negative integer

Thus, the sample rate must be at least twice the bandwidth of the input signal, and must be one of several discrete frequencies determined by the parameter n in equation (2). If $f_s$ is chosen to meet the two criteria, the aliases of the input spectrum will be equally spaced from one another without overlap. As a result, the signal will be represented perfectly by the digital samples. In the preferred embodiment, an 80 MHz sample rate corresponds to n=38.

The output of A/D converter 210 is provided to a tunable multi-stage digital bandpass filter 220, which in the preferred embodiment is implemented in an ASIC. The filtering technique will be discussed in further detail below. For now, it is sufficient to note that the filter 220 is a 2500:1 digital decimation filter. A DSP-based demodulator 230 provides coefficients used in the filter stages of filter 220. Static RAM banks 250 (2K×16×4) receive table data which are downloaded from DSP 230, and are accessed by filter 220, two banks at a time, via parallel 16-bit lines, in accordance with 11-bit addresses whose derivation also will be described in further detail below.

Figure 3:
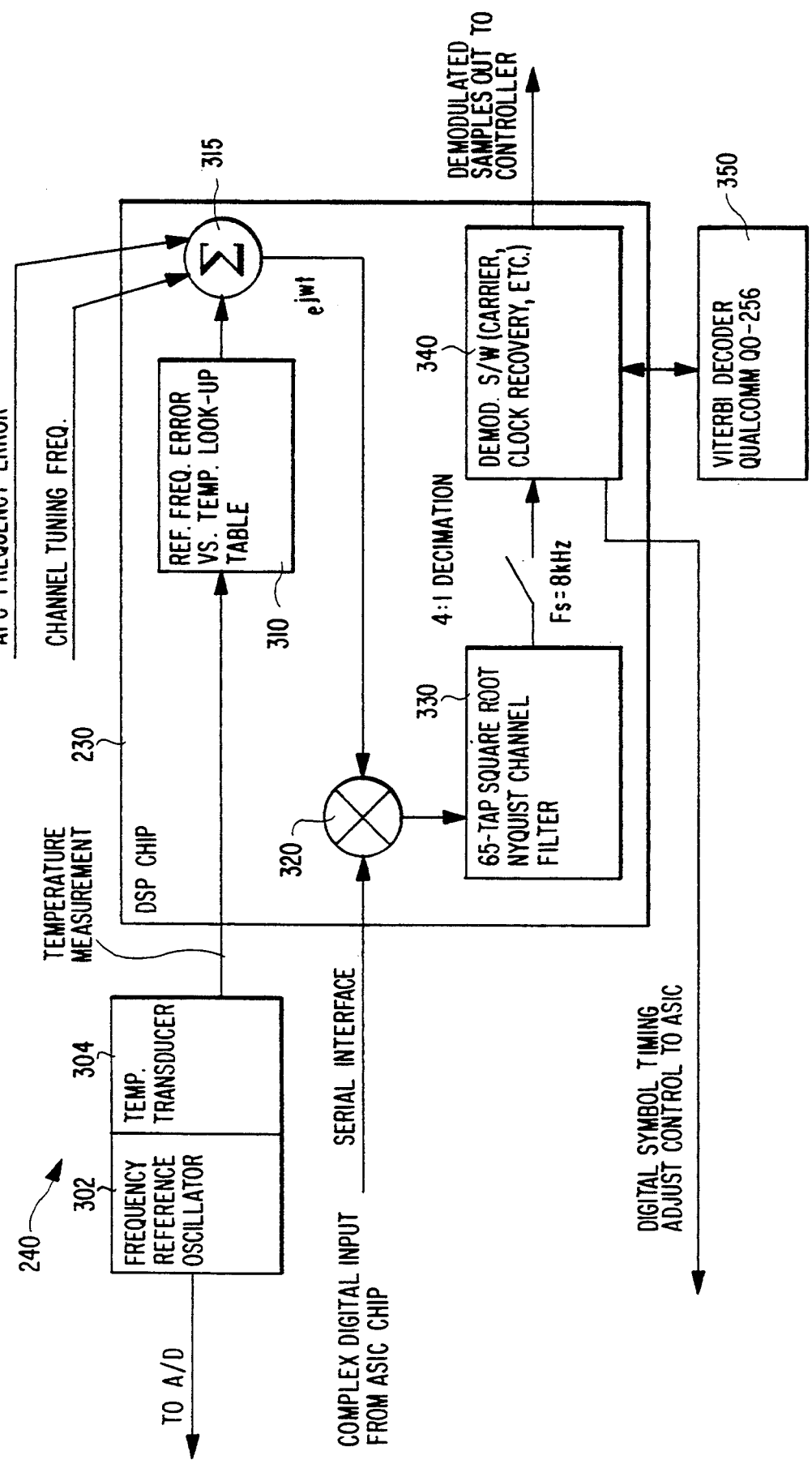
FIG. 3 is a block diagram of a DSP-based demodulator used in accordance with the first embodiment of the invention.

The output of filter 220 comprises complex samples, at a sampling frequency of 32 kHz, in accordance with the 2500:1 decimation. The DSP 230 receives these complex samples, and also (as shown in FIG. 3) receives temperature measurement information from reference oscillator 240, which in the preferred embodiment is a medium-stability oscillator with an associated temperature transducer. The oscillator 240 provides a sample clock to A/D converter 210. The sample clock is not adjusted with temperature drift; instead, the DSP 230 contains a look-up table (FIG. 3) which provides compensation values for temperature drift to the filter 220 outputs themselves.

Looking more closely at FIG. 3, reference oscillator 240 is comprised of oscillator section 302 and temperature transducer 304. Unlike other approaches in which operation of the oscillator is controlled as a function of temperature in order to compensate for temperature drift, in accordance with the present invention temperature measurement information is provided to DSP 230. DSP 230 contains a reference frequency error versus temperature look-up table 310 which provides temperature error compensation information to a summing section 315. Summing section 315 also receives channel tuning frequency information and other error information (such as that relating to Doppler shift, shown in FIG. 3 as automatic frequency control (AFC) frequency error), and provides a complex summed output to mixing section 320. Mixing section 320 also receives the complex sampled outputs from ASIC 220. In this manner, the sampled outputs themselves are adjusted for various types of errors, as will be discussed below.

The output of mixing section 320 is provided to a 65-tap square-root Nyquist channel filter 330, which provides a 4:1 decimation to a 8 kHz sample frequency to a demodulation section 340 which removes the carrier signal, recovers the clock, and the like. Demodulated samples then are sent to a controller (not shown).

The demodulation section 340 communicates in a known fashion with a Viterbi decoder 350. The demodulation section 340 also provides digital symbol timing (phase) control to ASIC 220, as will be discussed below.

FIG. 3 also shows a block diagram of the frequency tracking scheme within the demodulator DSP 230. For an O-QPSK modulated 60% filtered signal, the one-sided 3 dB signal bandwidth is 2 kHz and the total bandwidth is 3.2 kHz. Frequency tracking must be much more precise than 2 kHz for coherent demodulation. The transmitted signal can often have a frequency error of 1 kHz or more. In addition, if the demodulator is to be used inside an aircraft in flight, the Doppler frequency shift at L-band can be up to ±2 kHz. In addition, a relatively low-cost sample-clock oscillator with an accuracy of 5 parts-per-million can cause a downconversion frequency error of ±7.7 kHz. Consequently, the digital filter must have a total 3 dB one-sided bandwidth of ±11 kHz. The digital filter then can be fixed upon channel assignment and real-time frequency tracking is accomplished in the demodulator DSP 230.

Transmitter and Doppler frequency errors can be obtained from either the demodulator carrier recovery loop or other external means. The reference oscillator frequency error can be obtained easily because the prime source of drift in a crystal oscillator such as that used in reference oscillator 302 is from temperature variations. The oscillator frequency versus temperature behavior can be calibrated by the manufacturer and stored in permanent memory in the demodulator DSP 230, as described above. A temperature transducer such as transducer 302 (FIG. 3) capable of supplying a digital output byte to the demodulator DSP chip is mounted directly on the oscillator 302. The DSP 230 can periodically (e.g. once per second) read the temperature value, perform a table look-up, and make the necessary frequency calculations.

The DSP 230 then sums the frequency errors from all sources and makes the final downconversion precisely to baseband using a frequency rotation:

$$y(n) = x(n) * e^{\frac{j2\pi n f_e}{f_s}}$$

where
x=complex demodulator DSP input
y=complex baseband output
$f_e$=total frequency error
$f_s$=sample rate (32 kHz)

The downconversion is quite simple because of the relatively slow sample rate. 16 bits of accuracy is more than adequate to meet the required phase noise specifications. Phase noise is limited only by the reference oscillator characteristics.

While for purposes of illustration the DSP operation has been described in block diagram, it will be appreciated by those of working skill in this field that much of the operation of the DSP is implemented in software.

For reasons of economy and simplification of the downconverter design, the tuning range is limited to 20 MHz in the middle of the total 34 MHz Inmarsat-M frequency range (1530–1550 MHz).

Solely for purposes of illustration, an L-band mobile satellite receiver for the Inmarsat-M system has been chosen as a representative design case. However, it should be noted that the inventive design also is applicable to other L-band systems with little or no modification. The Inmarsat-M specifications are given in Table 1 below. Tables 2A and 2B show the limit specifications for phase noise for reception and transmission for operation in the Inmarsat-M system.

TABLE 1

| Inmarsat-M Mobile Receiver Specifications | |
|---|---|
| Operating Frequencies | 1525–1559 MHz |
| Channel Frequency Spacing | 5 kHz |
| Access Method | SCPC FDMA |
| Modulation | O-QPSK |
| Transmission Rate | 8 kbit/s |
| Symbol Rate | 4 kbit/s |
| Transmit, Receive Filters | 60% Square-root raised cosine |
| Maximum Frequency Uncertainty at L-Band | ±966 Hz |
| Mobile Receiver Input C/No | 41.0 dB-Hz |
| Maximum Received Phase Noise at L-Band | See Table 2A |
| Maximum Transmitted Phase Noise at L-Band | See Table 2B |

TABLE 2A

| Limit Mask for Inmarsat-M Received Phase Noise at L-band | |
|---|---|
| Offset from Actual Transmitted Carrier Frequency | SSB Phase Noise Limit (in 1 Hz Bandwidth) |
| 10 Hz | −33.5 dBc |
| 100 Hz | −60.5 dBc |
| 1,000 Hz | −74.5 dBc |
| 10,000 Hz | −79.0 dBc |

TABLE 2B

| Limit Mask for Inmarsat-M Received Phase Noise at L-band | |
|---|---|
| Offset from Actual Transmitted Carrier Frequency | SSB Phase Noise Limit (in 1 Hz Bandwidth) |
| 10 Hz | −42.0 dBc |
| 100 Hz | −65.0 dBc |
| 1,000 Hz | −73.0 dBc |
| 10,000 Hz | −90.0 dBc |

In Tables 2A and 2B, SSB stands for single sideband.

An important aspect of the invention is the sampling technique used, including sampling rate, RF input frequency, and the resolution of the digital quantizer. The bandpass sampling technique is best understood by referring to FIG. 4, which shows the spectra at each step of the downconversion process shown in FIGS. 2 and 3.

FIG. 4(a) shows the analog frequency spectrum after the RF input bandpass filter 202. The passband is from 1530–1550 MHz; FIG. 4(a) shows both positive and negative frequency components. The shaded areas in the figure represent the rolloff of the RF filter 202. After the bandpass signal is sampled with A/D converter 210, an aliased spectrum is observed, as shown in FIG. 4(b) for an ideal sample-and-hold process.

Figure 4D:
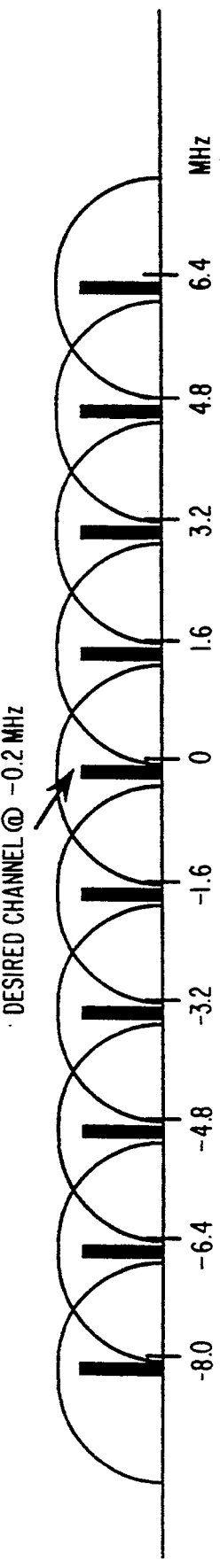

After sampling, the digital signal is filtered with a digital bandpass filter 220 which is tuned to the desired channel frequency. The digital filter rejects all negative frequencies; as a result, the filter coefficients are complex. FIG. 4(c) shows a channel frequency of 1547 MHz. However, the digital filter actually has a center frequency of 27 MHz, an alias of 1547 MHz. Once the signal bandwidth has been reduced by the digital filter, the sample rate can be decimated to a lower rate. FIG. 4(d) shows 50:1 decimation to $f_s$=1.6 MHz, corresponding to a first stage of the filter 220. The spectrum now repeats every 1.6 MHz and, although each alias substantially overlaps its adjacent aliases due to the broad digital filter rolloff, there is no spectral overlap into the desired channel. The alias of the desired channel closest to baseband is at −0.2 MHz.

Figure 4E:
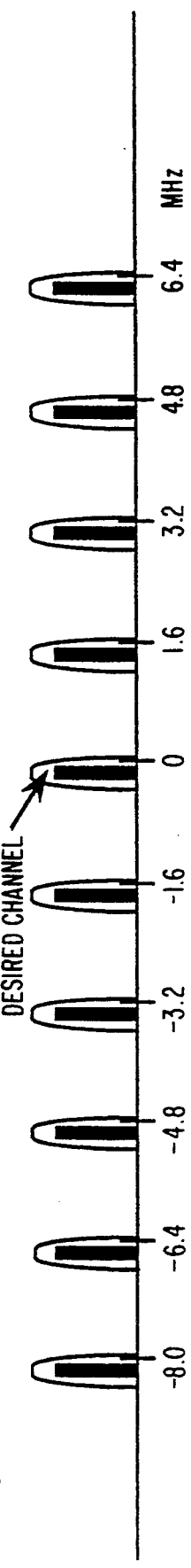
Figure 4F:
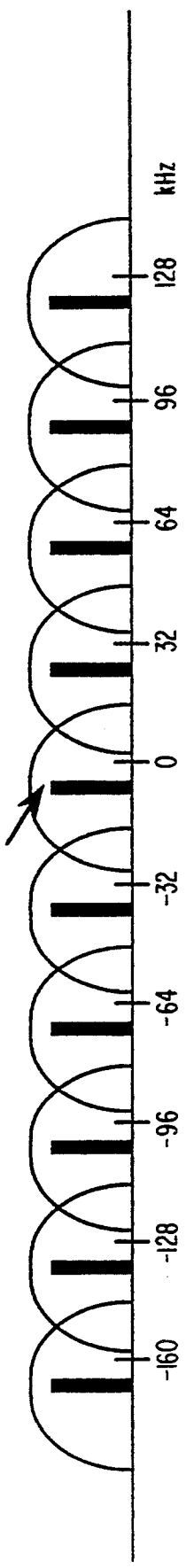
Figure 4G:
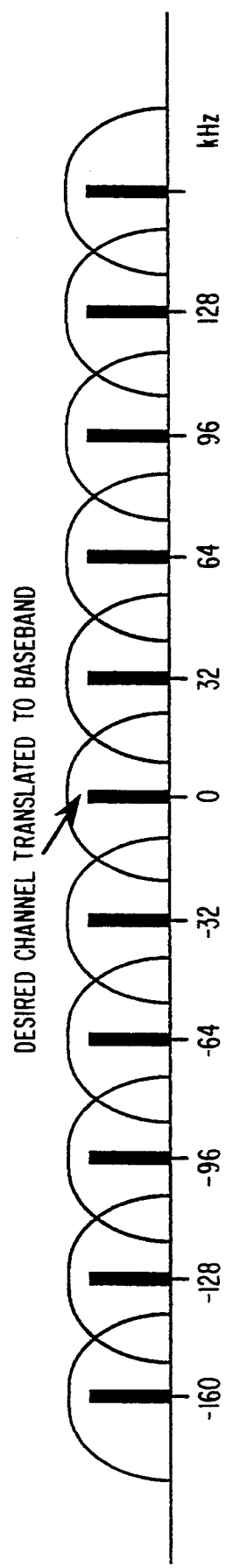
Figure 4H:
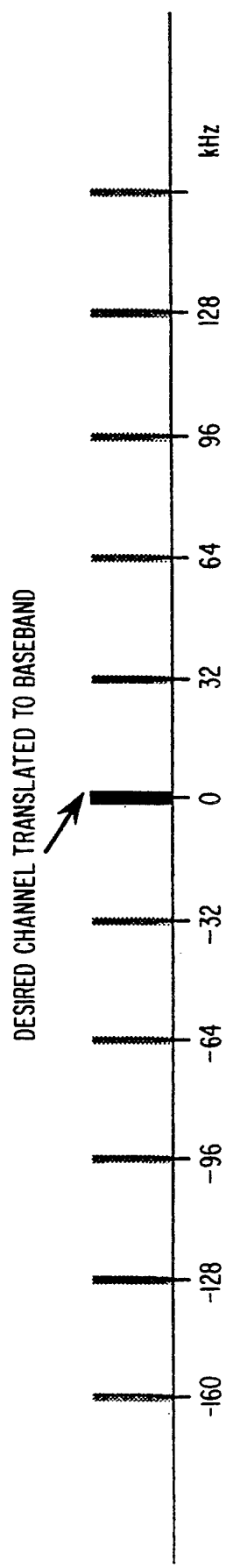

Once the sampling rate has been reduced, an extremely sharp multi-stage digital filter can be implemented efficiently to perform the final channel selection, as shown in FIG. 4(e), corresponding to the fourth stage of filter 220. Next, the sample rate is decimated to 32 kHz and the desired channel has an alias at −8.0 kHz, as seen in FIG. 4(f), corresponding to an output stage of filter 220. Finally, the digital samples are multiplied by a complex exponential with frequency 8 kHz in the DSP chip, as shown in FIG. 4(g). The resulting baseband I and Q channel samples are filtered with a matched filter, as shown in FIG. 4(h), and are then ready for demodulation.

Downconverter performance is highly dependent on the specifications of the A/D converter 210 that is chosen. Although the sampling rate is not prohibitively high, the A/D input circuitry must be capable of handling the highest RF signal frequency (1550 MHz in the specific case being discussed in connection with the preferred embodiment, though the invention is not so limited). However, the resolution required is very low. Consequently, it is contemplated presently that a 3-bit A/D converter should give extremely good performance. Ideally, the A/D converter should have a bandpass input amplifier with a 1540 MHz center frequency.

When sampling a 1550 MHz carrier frequency, the timing uncertainty (aperture jitter) of the sampler must be small enough that the amplitude error is less than one half of a least significant bit (LSB). This error is given by the following equation:

$$\Delta t = \frac{2^{-m}}{\pi \cdot f_{max}} \quad [3]$$

where
    $m$ = the number of bits of resolution
    $f_{max}$ = the maximum signal frequency For $m = 3$ bits and $f_{max} = 1550$ MHz, $\Delta t = 25$ ps. This jitter specification is readily achievable with current technology, in a known fashion.

In terms of overall signal-to-noise (S/N) ratio, a 1-bit A/D converter should be sufficient, because of the high sampling rate. An S/N ratio of greater than 30 dB is sufficient for O-QPSK demodulators. The digital filtering removes a substantial portion of the wide-band quantization noise, and in general S/N improves by 3 dB for every octave increase in the oversampling ratio. For a 4 kHz symbol rate sampled at 80 MHz, S/N is improved by 43 dB (approximately six bits of resolution). However, two to three bits of resolution are recommended to minimize discrete intermodulation distortion products within the digital filter passband.

Figure 5:
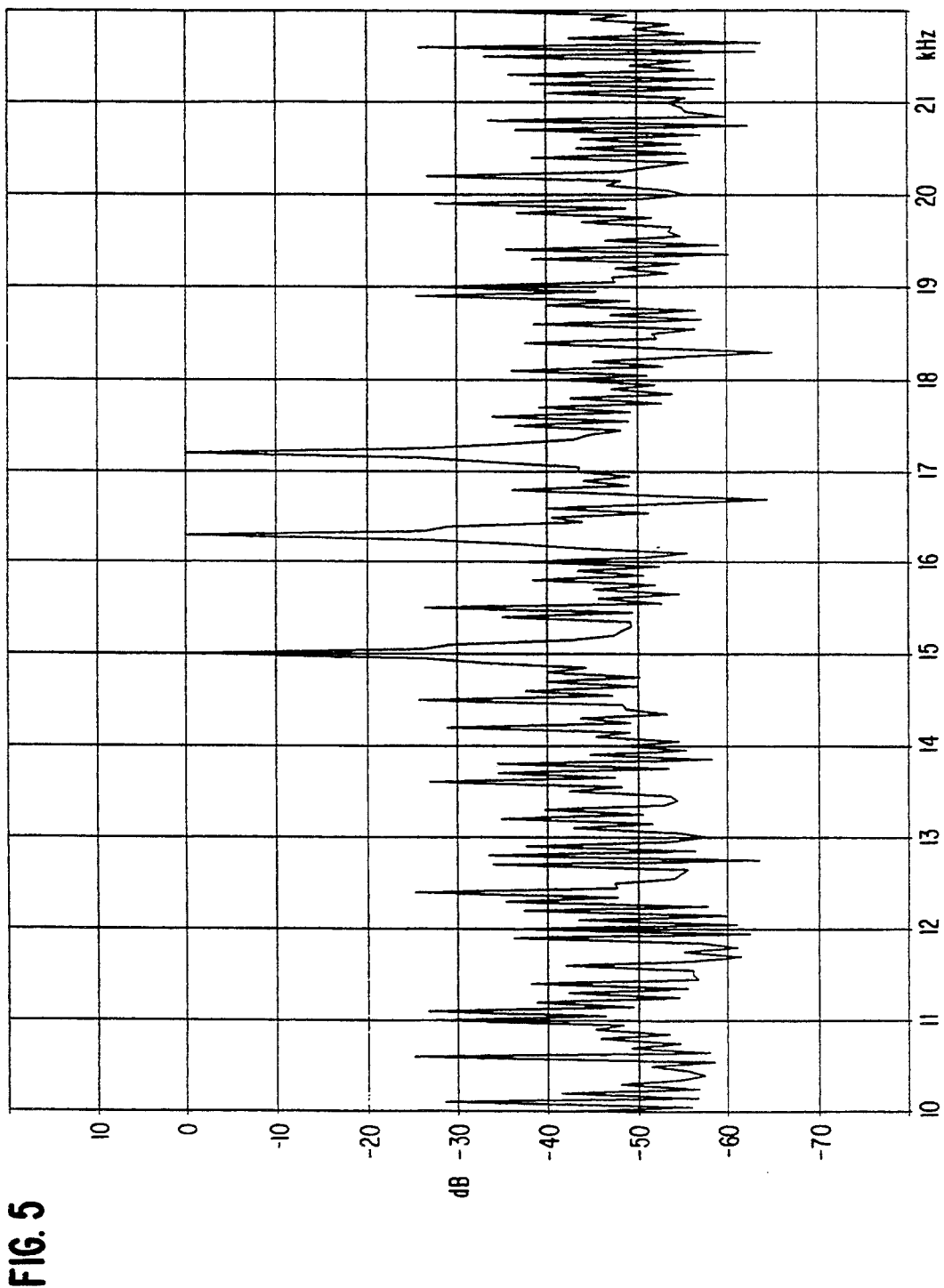
FIGS. 5 and 6 show results in accordance with the first embodiment of the invention, using sampling techniques of varying resolutions.
Figure 6:
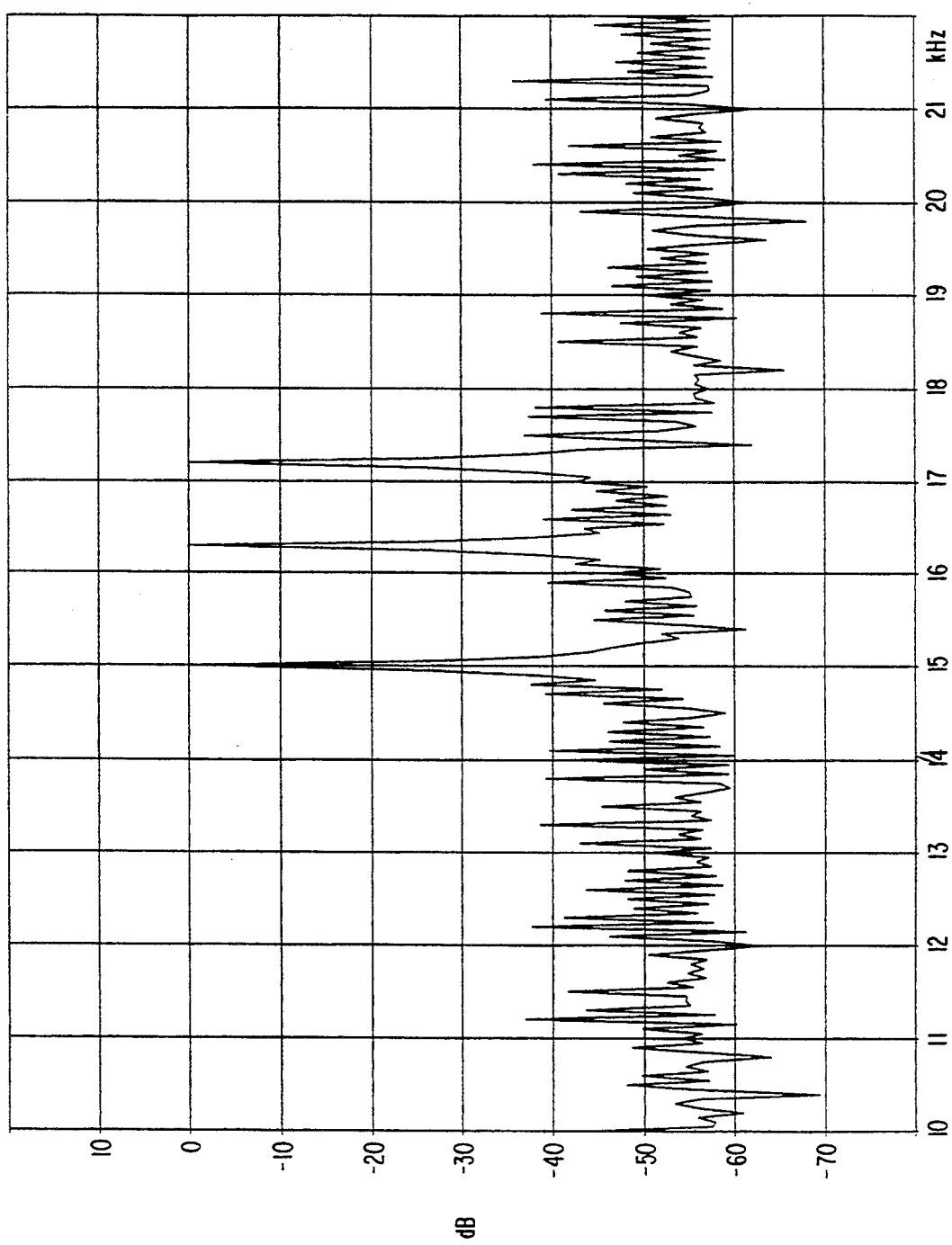

A spectral plot of three equal-amplitude sinusoidal tones at 1233.999 MHz, 1234.0003 MHz, and 1234.0012 MHz sampled by an ideal 2-bit A/D converter and digitally filtered (with a filter that is described below) is shown in FIG. 5. The results shown are taken from a computer simulation. However, finite integer filter coefficient quantization and arithmetic computations are included. It should be noted that the three tones have aliased to 15.0, 16.3, and 17.2 kHz as a result of the sample rate decimation to 32 kHz. There are several distortion products between 25–30 dB down. FIG. 6 shows a spectral plot of the same three tones sampled by an ideal 3-bit A/D converter and digitally filtered (again, with the filter to be described below). All distortion products are greater than 35 dB down.

The dynamic performance of a 1-bit A/D converter may be improved using a bandpass sigma-delta modulator in a known fashion as described, for example, in S. Jantzi et al., "Bandpass Sigma-Delta Analog-to-Digital Conversion", IEEE Transactions on Circuits and Systems, Vol. 38, No. 11, November 1991.

Figure 7:
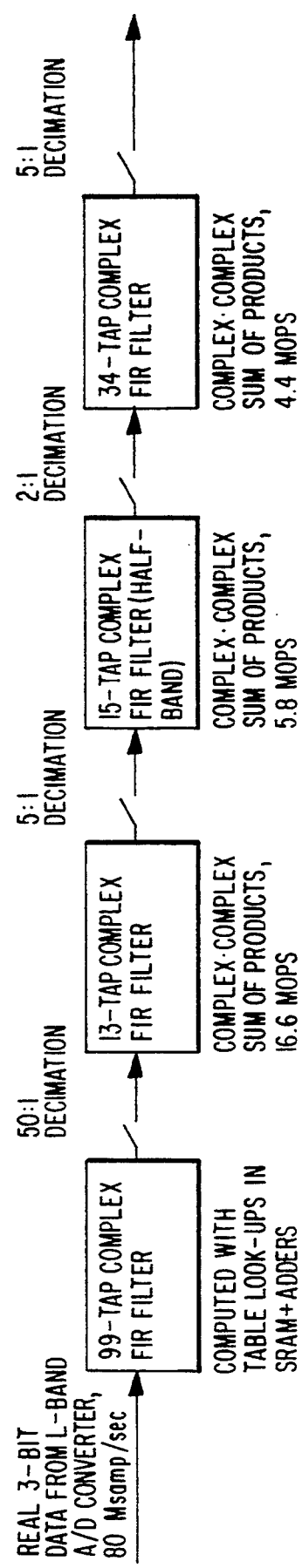
FIG. 7 is a block diagram depicting a digital decimation filter algorithm for downconversion in accordance with the first embodiment of the invention.

Frequency channel selection within the 20 MHz tuning range and sample rate decimation is accomplished with a digital bandpass filter shown in FIG. 2. The filter also decimates the sample rate by 2500:1 down to 32 kHz. The filter is implemented as a cascade of four linear-phase, bandpass decimation finite impulse response (FIR) filter stages for optimal efficiency, as shown in FIG. 7. The bandpass filter coefficients are all derived from equivalent lowpass filter designs of comb, half-band, and equi-ripple filters. Specifications of each filter stage are given in Table 3 for the equivalent lowpass designs.

TABLE 3

| Four-Stage Digital Downconverter Filter Specifications | | | | | | | |
|---|---|---|---|---|---|---|---|
| Stage/ Filter Type | Number of Taps | Input/Output Sample Rate | Decim. Ratio | Passband Cutoff Freq. | Stopband Corner Freq. | Max. Passband Ripple | Min. Stopband Atten. |
| 1 Comb | 99, Complex | 80 MHz/ 1.6 MHz | 50:1 | — | — | — | — |
| 2 Comb | 13, Complex | 1.6 MHz/ 320 kHz | 5:1 | — | — | — | — |
| 3 Half-Band | 15, Complex | 320 kHz/ 160 kHz | 2:1 | 8 kHz | 88 kHz | ±.012 dB | 81 dB |
| 4 Equi-ripple | 34, Complex | 160 kHz/ 32 kHz | 5:1 | 8 kHz | 24 kHz | ±.025 dB | 70 dB |
| Total Stages 1–4 | | | 2500:1 | 7.2 kHz | | | |

Stage 1 is a 99-tap comb filter with a decimation ratio of 50:1 and frequency response of $$\left[\frac{\sin(x)}{x}\right]^2.$$

The lowpass equivalent filter coefficients can be derived by convolving a sequence of 50 ones with itself to give a ramp function:

$$h_1(n) = n/2500 \quad n = 1, 2, \ldots, 50$$
$$h_1(n) = (100 - n)/2500 \quad n = 51, 52, \ldots, 99$$

Stage 2 is a 13-tap comb filter with a decimation ratio of 5:1 and frequency response of $$\left[\frac{\sin(x)}{x}\right]^3.$$

The lowpass equivalent filter coefficients can be derived by convolving three sequence of 5 ones with itself (see Table 4). Stages 3 and 4 can be designed using the Parks-McClellan equiripple design algorithm available in several commercial filter software design packages. Half-band filters are discussed in detail in texts such as Crochiere and Rabiner, *Multirate Digital Signal Processing*, Chapter 5 (Prentice-Hall, 1983).

TABLE 4

| Stage 2 Lowpass Filter Coefficients | | | |
|---|---|---|---|
| n | Stage 2 $h_2(n)$ | n | Stage $h_2(n)$ |
| 1 | .008 | 8 | .144 |
| 2 | .024 | 9 | .120 |
| 3 | .048 | 10 | .080 |
| 4 | .080 | 11 | .048 |
| 5 | .120 | 12 | .024 |
| 6 | .144 | 13 | .008 |
| 7 | .152 | | |

Figure 8:
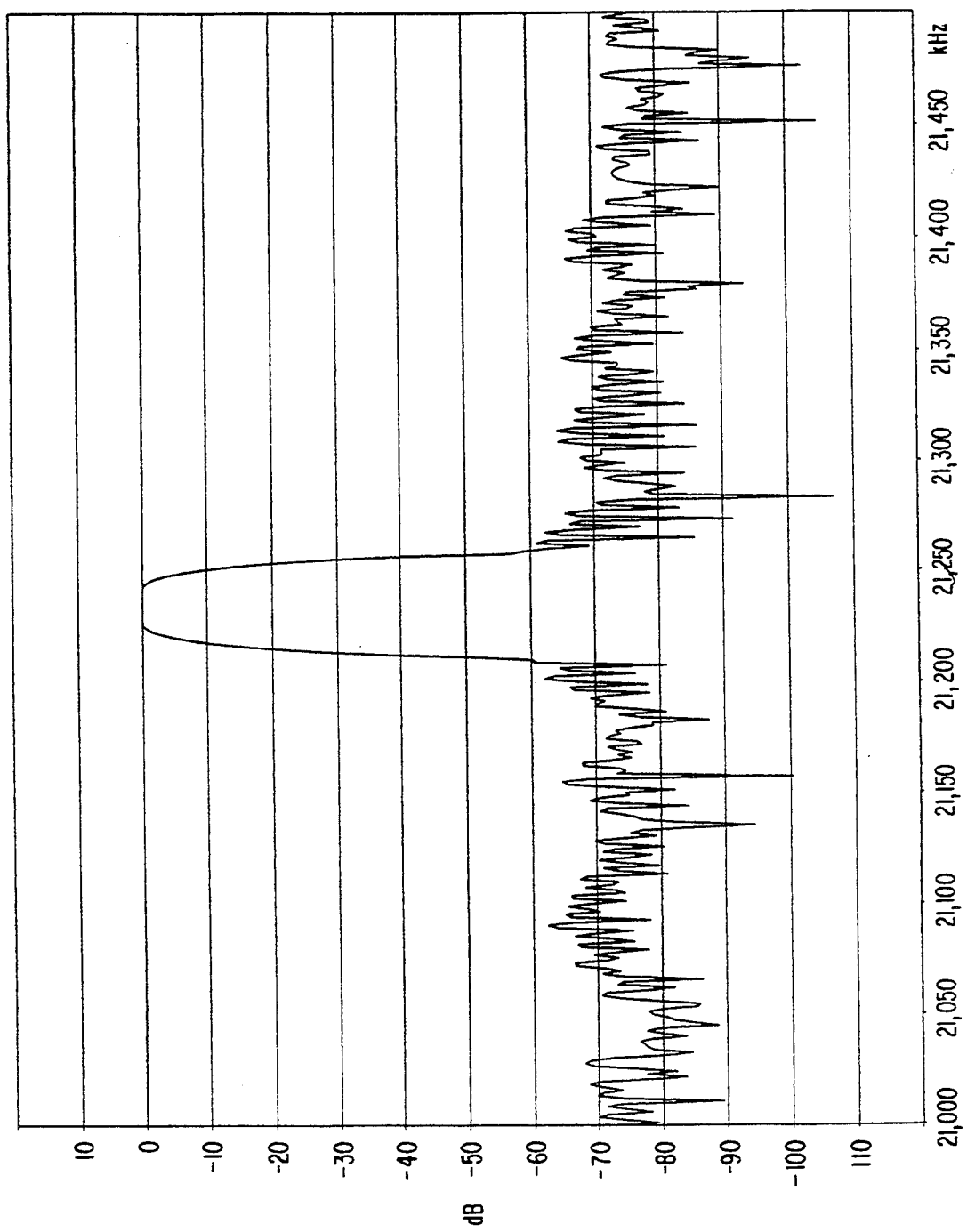
FIGS. 8 and 9 show filter composite response at different resolutions in accordance with the first embodiment of the invention.
Figure 9:
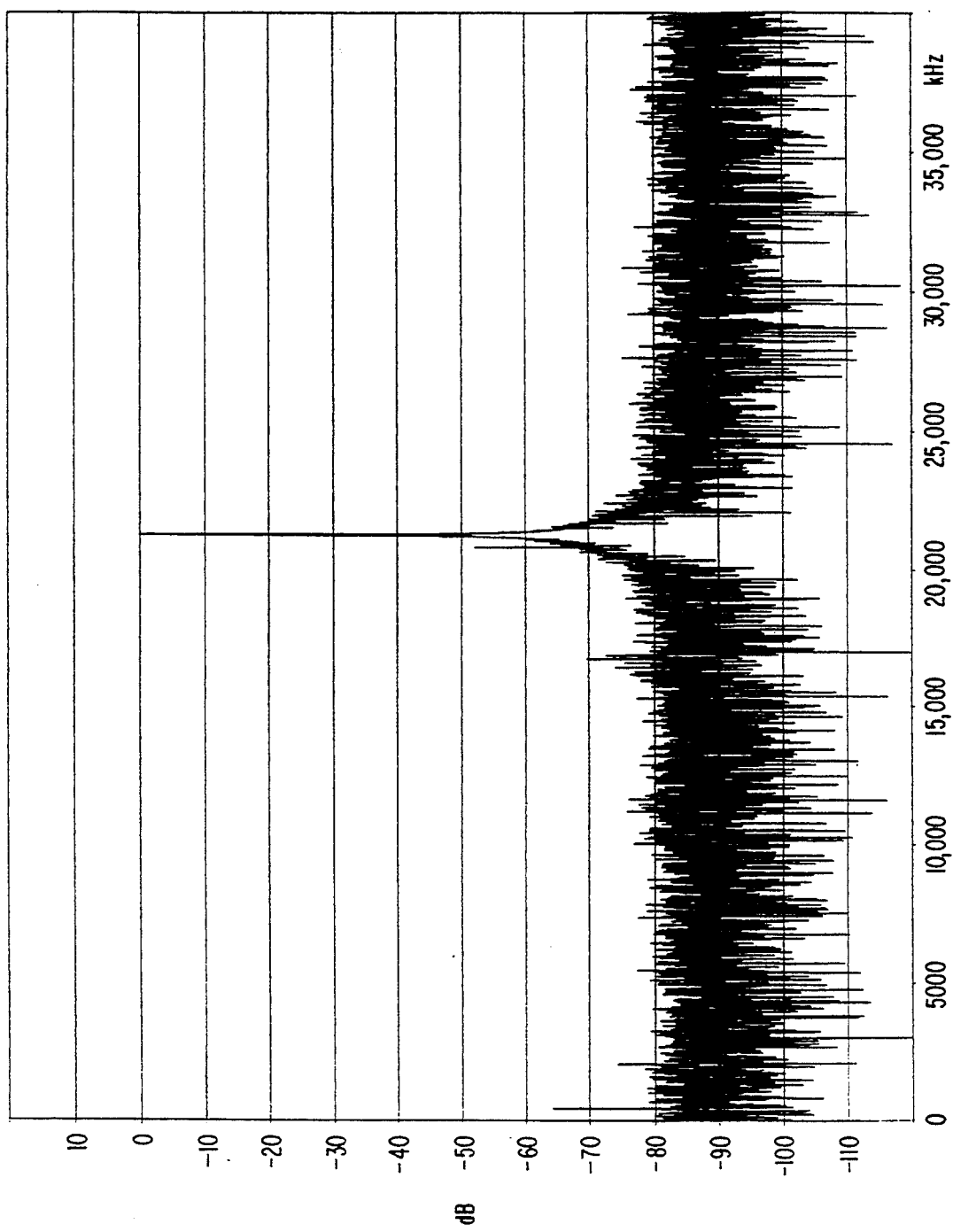

Table 5 shows the specifications of the composite 4-stage cascaded filter design. The composite frequency response is shown in FIGS. 8 and 9 for a channel frequency of 1221.234 MHz (the filter being tuned to 21.234 MHz—an 80 MHz alias of the channel frequency). The filter is flat within ±0.014 dB for frequencies within ±7.2 kHz of the channel frequency. The filter is greater than 70 dB down for frequencies farther than ±450 kHz from the channel frequency. Specifications include degradations of the finite arithmetic word sizes of the digital hardware described below.

TABLE 5

| Composite 4-Stage Lowpass Filter Specifications | | | | |
|---|---|---|---|---|
| Number of Taps | Input/Output Sample Rate | Decimation Ratio | Passband Response | Stopband Response |
| 21,478 equiv. taps @ 80 MHz | 80 MHz/32 kHz | 2500:1 | 0-7.2 kHz ± 8.0 kHz 12.9 kHz | .014 dB −.08 dB 03 dB | 24-450 kHz −60 dB >450 kHz −70 dB |

The lowpass filter coefficients of each stage are stored in the control processor; in the preferred embodiment, this would be the DSP demodulator. The lowpass filters can be readily converted to bandpass designs using the following simple frequency translation formula:

$$h_b(n) = h_l(n) * e^{\frac{j2\pi n f_c}{f_s}}$$

where
$h_b$ = translated bandpass filter coefficient
$h_l$ = lowpass filter coefficient
$f_c$ = channel frequency
$f_s$ = sample rate The bandpass filter coefficients become complex and non-symmetric about the center tap as a result of the multiplication by the complex exponential. However, the transformation is quite simple, and controlling DSP 230 can use the same sine and cosine tables required for the frequency translation to baseband described previously. The filter coefficients only need to be computed and downloaded to the filter ASIC 220 once upon channel assignment.

Figures 10A, 10B:
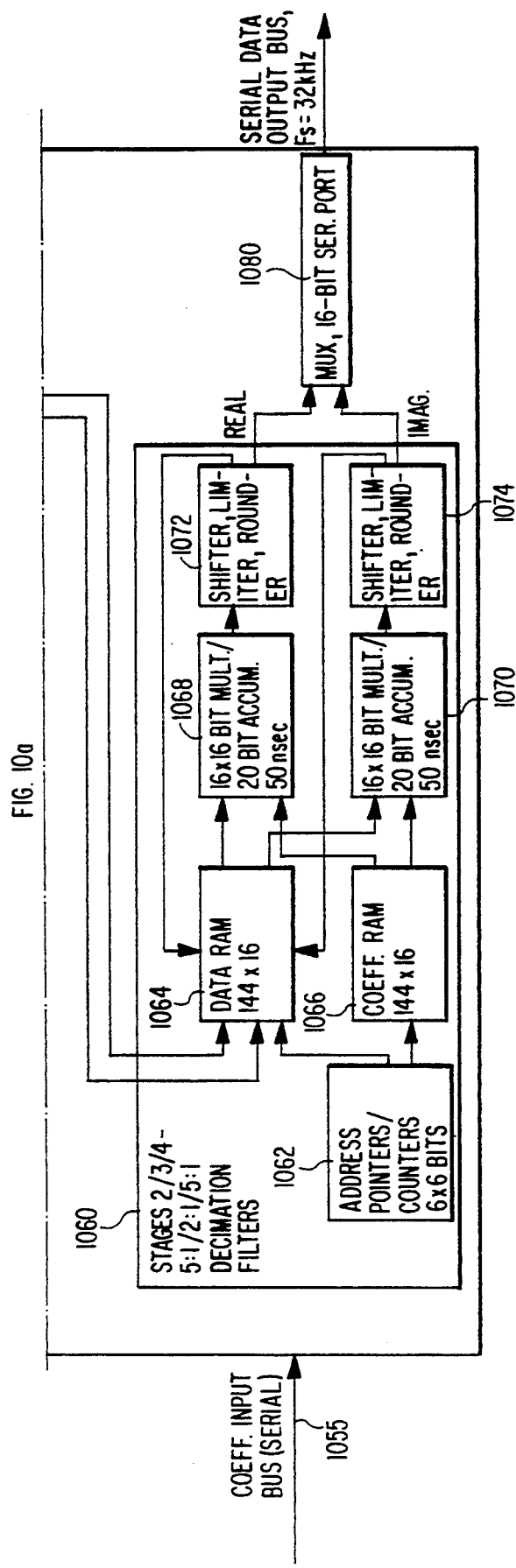
FIG. 10 is a block diagram of the hardware employed in the digital decimation filter used in the first embodiment of the invention, corresponding to the algorithm shown in FIG. 7.

A block diagram of the major hardware functions to implement the 4-stage filter is shown in FIG. 10. The entire filter can be implemented in a single CMOS ASIC (either array or cell based) plus 2K×64 bits of RAM 250 (FIG. 2). Stage 1, a 50:1 decimation filter 1010, is implemented using a table look-up approach because of the high speed involved. Two 3-bit inputs are latched in latches 1012, 1014, 1016, and 1018 so that two filter taps can be looked up simultaneously. Logic circuitry, comprising a clock logic and state sequencer 1020, details of which are not essential to an understanding of the invention, identifies which of 25 tap pairs within the first 50 taps is being accessed. In this manner, two 11-bit addresses are supplied to respective pairs of banks of the look-up RAM 250 (FIG. 2).

The look-up RAM 250 is divided into 4 banks of 2K×16-bit words each. Banks 1 and 2 are used for looking up the respective real and imaginary results for the first 50 taps. Banks 3 and 4 are used for looking up the respective real and imaginary results for the second 49 taps. All banks are accessed in parallel, requiting a 64-bit memory bus with a 40 MHz bus speed. The two 3-bit latched data inputs are delayed by 50 taps using a 25×6-bit register file 1022. The RAM contents are loaded from an external control processor so that the filter can be readily tuned to any desired frequency.

The look-up results are output from each bank as 16-bit values. Pairs of values from respective pairs of RAM banks are added in 16-bit adders 1030, 1032. Outputs of adders 1030, 1032 are accumulated in respective 20-bit accumulators 1040, 1042, which are cleared every 50 A/D clock cycles to yield a 50:1 decimation ratio. The results, which are complex, are rounded to 16 bits in respective scaler/rounder/limiters 1050, 1052 before being passed to stage 2.

Stages 2, 3, and 4 are implemented with a pair of 16×16-bit multiplier accumulators 1068, 1070, a bank of coefficient RAM 1066, and a bank of data RAM 1064, as shown. The multiplier accumulators are each clocked at a rate of 20 MHz and are time-shared between all three stages using control logic 1000. As shown in FIG. 10, the output of stage 1 is provided to 144×16 data RAM 1064. 144×16 coefficient RAM 1066 receives coefficient information which is downloaded from DSP 230 via bus 1055. RAM 1064 and 1066 also receive output of 6×6 bit address pointer/counters 1062, and provide respective outputs to the multiplier-/accumulators 1068, 1070. Shifter/limiter/rounders 1072, 1074 round the results from respective multiplier- /accumulators 1068, 1070 in a known fashion, details of which are not essential to an understanding of the invention.

As a result of the foregoing, the output of the fourth stage provides 16-bit in-phase and quadrature values to multiplexer 1080 at a sample rate of 32 kHz, which includes a serial output interface to DSP 230.

The ASIC 220 operates with a 40 MHz clock input, and has dedicated serial busses for coefficient input and data output, as described above. The serial busses can be readily interfaced to standard DSP processor chips.

One advantage of the digital downconversion process of the present invention is that symbol timing correction, under control of the DSP demodulator's timing recovery loop, can be performed digitally in the ASIC with virtually no added complexity. In conventional digital demodulators, the A/D sample clock is steered by a timing correction circuit which is driven by the demodulator's timing recovery loop. The circuit shifts the sample timing phase so that sampling occurs at the maximum opening of the receiver eye pattern (i.e. sampling in the middle of a digital symbol) to minimize intersymbol interference. However, in the inventive digital downconverter, the A/D sample clock is free-running. The output of the stage 1 decimation filter is at a sample rate of 1.6 MHz, which corresponds to 400 samples per symbol. Symbol timing phase can be adjusted quite easily merely by shifting the samples in time as they come into the second stage FIR filter delay line. A shift of one sample corresponds to a shift in timing phase of 1/400 symbol, for a maximum timing adjustment error of ±0.45°. The resolution is sufficient that timing phase errors will cause negligible loss in bit error rate (BER) performance. The DSP 230's timing recovery loop provides a control signal (FIG. 3) which causes samples in the second stage FIR filter delay line data RAM 1064 to be either skipped or repeated as necessary until the proper timing phase is achieved. The timing control signal from the DSP 230 is fed to the control circuitry 1000 in the ASIC 220, as shown in FIG. 10. The control circuitry then determines whether to perform a filtering operation on the same input data (i.e. reuse the current input sample) or wait for two input samples to be shifted into RAM before filtering (i.e. skip an input sample).

As described in detail in the foregoing, in addition to its compact size, the inventive downconverter has the following advantages:

i) Extremely good phase noise performance. Since there are no local oscillators, mixers, or PLL circuits, the downconverter phase noise output should track accurately the phase noise of the frequency reference oscillator which provides the sample clock.

ii) Wideband digital filtering allows precise, flexible control of filter response. For example, filter coefficients can be derived (or trained using adaptive filtering techniques) to notch out known sources of interference.

iii) The scheme includes digital frequency compensation of reference frequency oscillator drift versus temperature. No oven is required. This saves approximately 1-2 watts of power required for the oven, and also provides for nearly instantaneous warm-up time, in contrast to the 30 minutes it takes for an oven to stabilize.

iv) Both wide tuning bandwidth and fine (approximately 1 Hz) frequency resolution are obtained with no compromise in other performance specifications (especially phase noise).

v) Digital filter is finite impulse response (FIR), linear phase. No group delay equalization is necessary.

vi) I and Q baseband samples have perfect phase and gain matching.

vii) Symbol timing phase adjustments are accomplished very easily without the need for any external hardware.

Although the invention has been discussed in detail thus far with reference to an Inmarsat-M downconverter, the inventive technique also is applicable to digital upconversion. In fact, phase noise specifications typically are more stringent in the transmitter than in the receiver for TDMA satellite transceivers. Thus, the low phase noise of the digital frequency tuning technique of the present invention becomes even more advantageous in such applications.

A digital upconverter can be designed using a scheme very similar to that for the receiver, except for reversal of the digital processing steps. The transmitter also uses a digital ASIC in conjunction with a transmit DSP to upconvert the signal from baseband. However, for simplicity, digital tuning is accomplished within a 1 MHz range, and the digital upconversion is to an intermediate frequency of 10 MHz. One or more analog IF stages are used to upconvert the signal to microwave frequencies (1640 MHz, for example).

Figure 11:
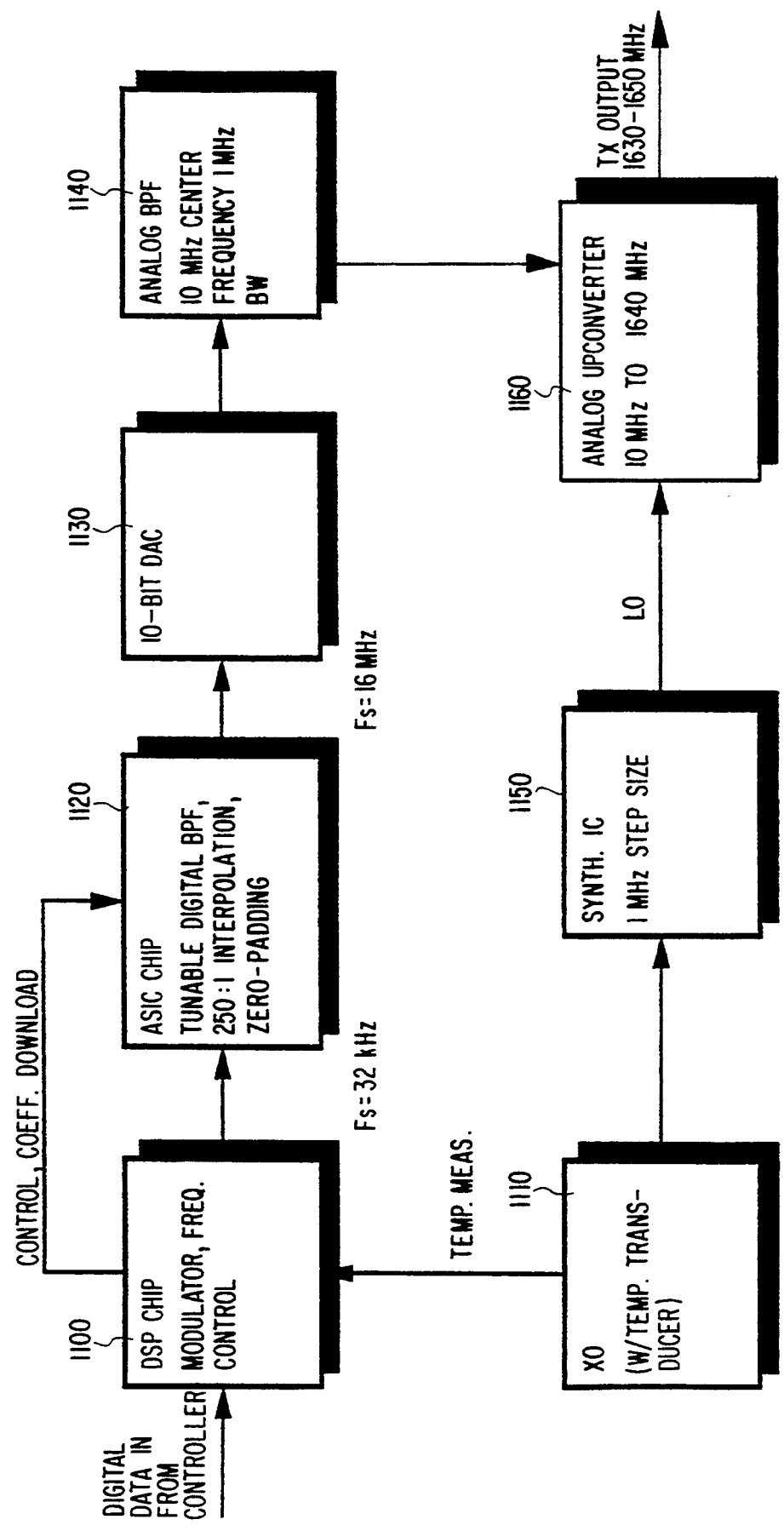
FIG. 11 is a diagram depicting transmitter architecture with an ASIC-based digital upconverter, in accordance with a second embodiment of the present invention.

An exemplary block diagram of the inventive upconverter is shown in FIG. 11. A DSP 1100 receives digital data at baseband from a controller (not shown). The DSP also receives temperature measurement information from an crystal oscillator 1110 which includes an integral temperature transducer. The DSP 1100 downloads coefficient information to an ASIC 1120, which comprises a tunable digital four-stage interpolation filter providing 250:1 interpolation, shown schematically in FIG. 14. The DSP 1100 also provides modulated samples at a sampling rate of 32 kHz to ASIC 1120.

The output of ASIC 1120, constituted by samples at a sampling frequency of 16 MHz, is provided to a 10-bit D/A converter 1130, which provides an analog output to an analog bandpass filter 1140, whose output in turn is provided to an analog upconverter 1160, of known constitution, for final conversion to L-band.

As shown, a synthesizer IC 1150 may be used to extend the tuning range of the upconverter by stepping the analog local oscillator 1110 in 1 MHz steps, and providing an LO output to analog upconverter 1160. However, phase noise performance is excellent because of the very large step size and simplicity of the analog synthesizer. With this scheme, digital channel tuning to a resolution of 1 Hz with real-time frequency tracking is accomplished readily.

Figure 12:
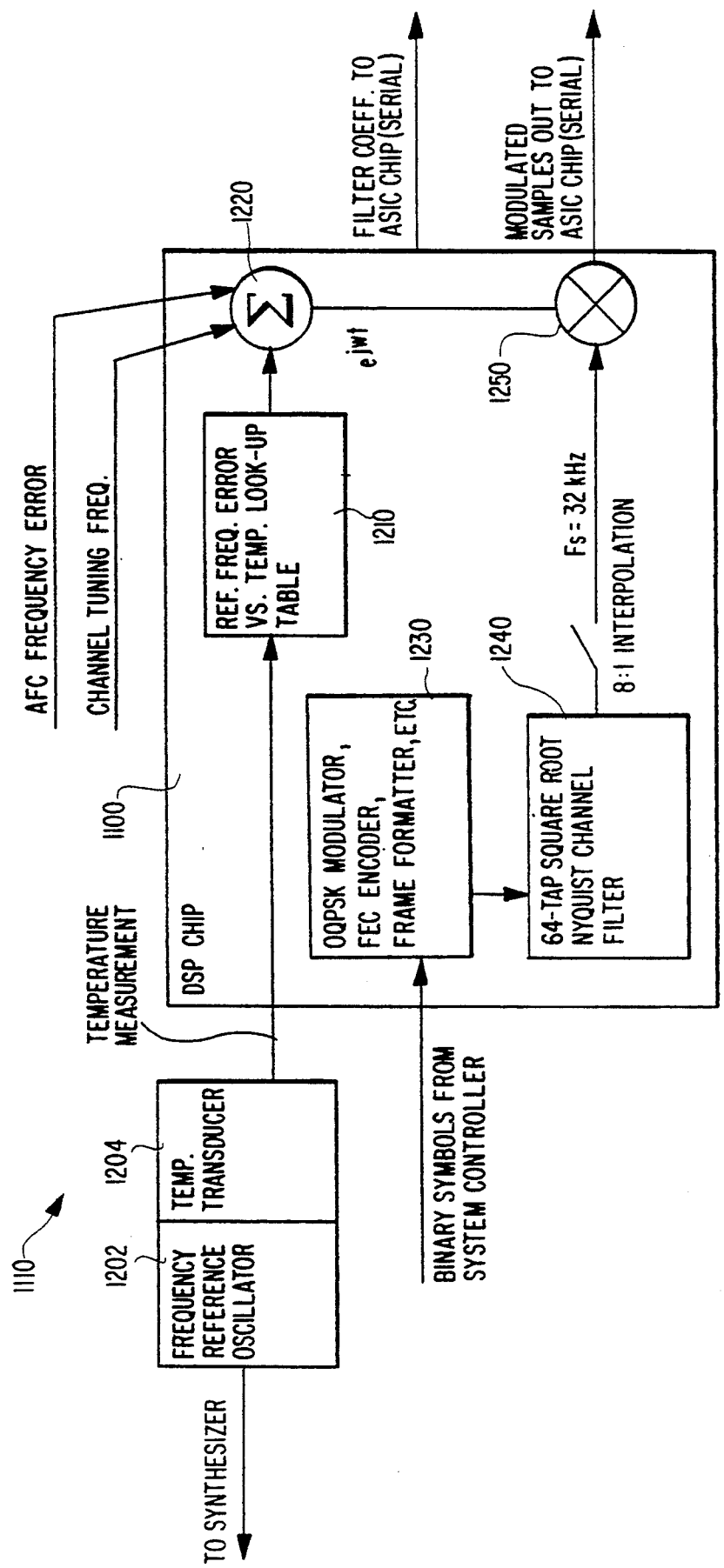
FIG. 12 is a block diagram of a DSP-based modulator for performing upconversion in accordance with the second embodiment of the invention.
Figure 13A:
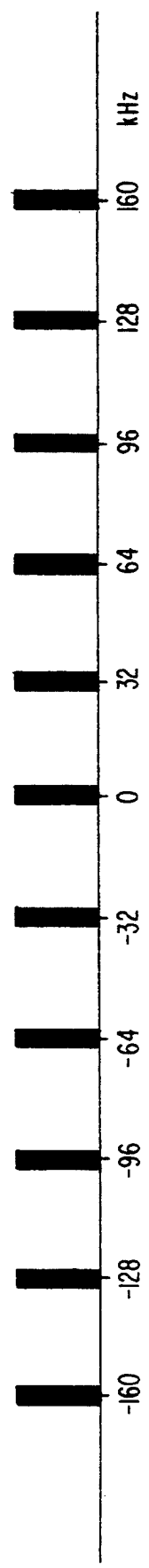
FIGS. 13(a)–(f) are graphs of spectra of an L-band signal during various stages of upconversion in accordance with the second embodiment of the invention.

Referring now to FIGS. 12-13, FIG. 12 is a block diagram of the DSP-based modulator 1100, and FIGS. 13(a)-(f) show the spectrum at each stage. First, baseband I and Q channel samples are filtered by a real 64-tap square-root Nyquist channel filter 1240 at a rate of 8 samples per symbol, as shown in FIG. 12. The filter is implemented as an interpolation filter, where the filter coefficients are divided into eight blocks of eight each. The filter outputs are obtained by first convolving eight data symbols by the first block of coefficients, then the second block, and so on, until the eighth output is obtained with a convolution by the eighth coefficient block. The delay line is shifted, and the process is repeated. The resulting baseband spectrum is shown in FIG. 13(a). The filtered signal has a two-sided bandwidth of 6.4 kHz (for a 60% rolloff filter), with aliases every 32 kHz.

Figure 13B:
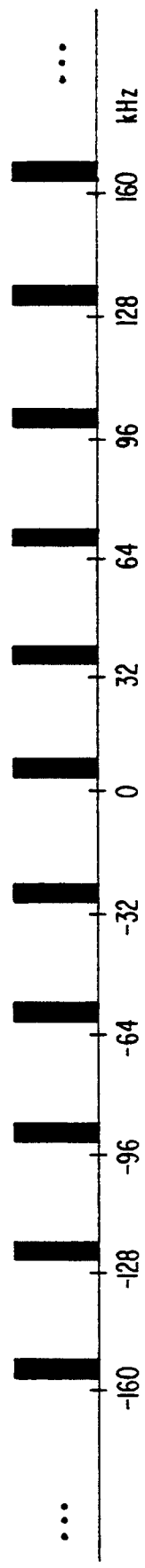

The filtered signal then is frequency-translated in the DSP 1100 to the correct channel frequency, including AFC and oscillator temperature compensation. Temperature compensation information is derived from look-up table 1210, based on temperature measurement information from temperature transducer 1204. The various compensation information is summed in summing section 1220, and is mixed with an output of filter 1240 in mixing section 1250, as shown in FIG. 13(b). The translation is identical to the one performed in the receiver using sine and cosine look-up tables, as described earlier. The sampling rate is 32 kHz. As in the previous embodiment, while for purposes of illustration the DSP operation has been described in block diagram, it will be appreciated by those of working skill in this field that much of the operation of the DSP is implemented in software.

Figure 13C:
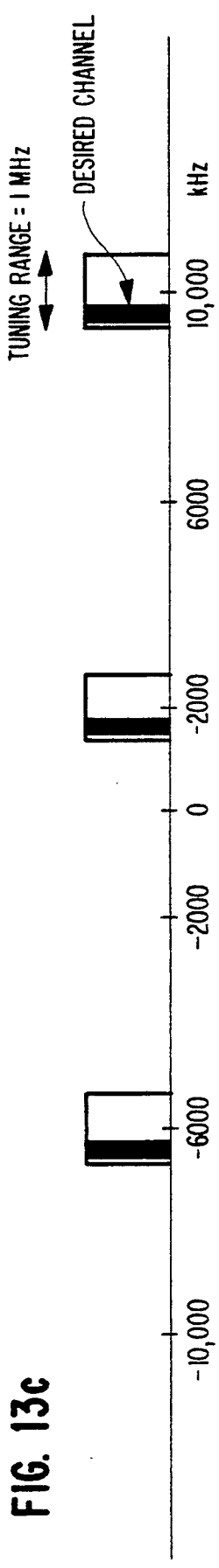
Figure 14:
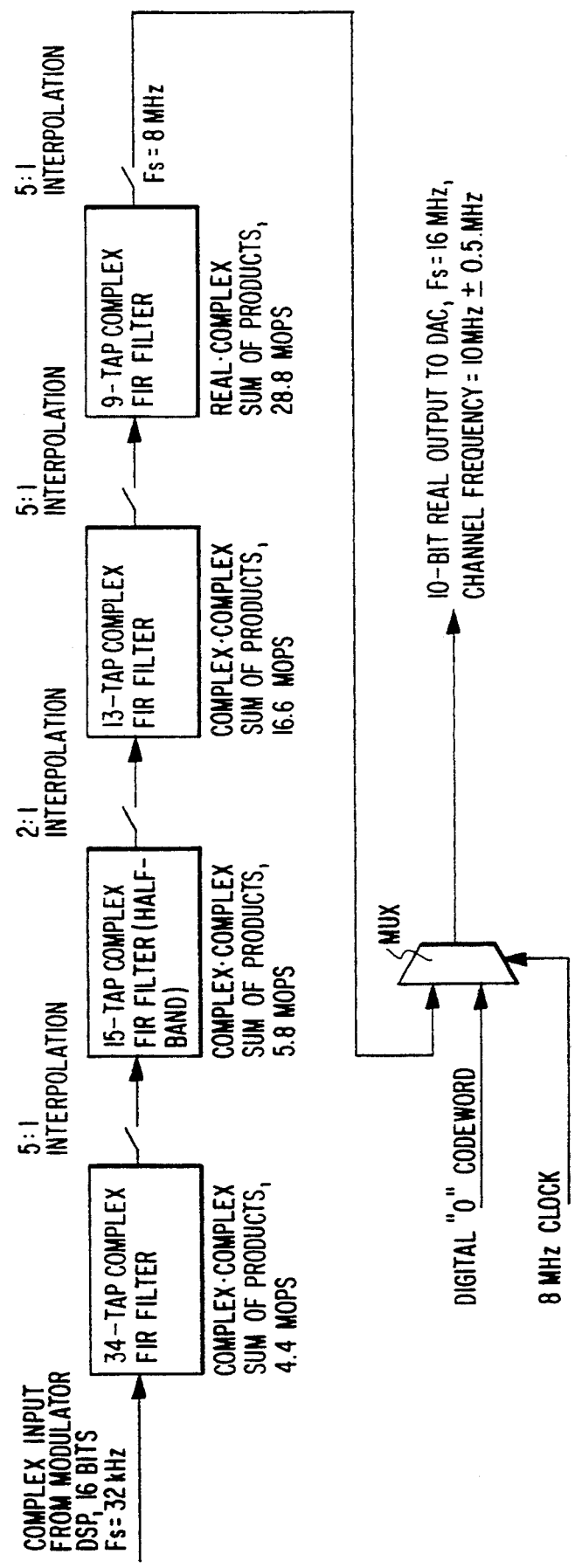
FIG. 14 is a block diagram depicting a digital decimation filter algorithm for upconversion in accordance with the second embodiment of the invention.

Next, the signal is filtered by a 250:1 interpolating bandpass filter in the ASIC 1120, as shown in FIG. 13(c). The filter increases the output sampling rate to 8 MHz, thus removing all alias components except those that occur at 8 MHz intervals. The filter also selects the correct alias component to tune to the proper frequency within the 1 MHz tuning range. This filter is very similar to the receive decimation filter, except that the ordering of each stage is reversed, as shown in FIG. 14. In fact, stages 1, 2, and 3 have the same coefficients as stages 4, 3, and 2, respectively, in the receiver, as will be appreciated by comparing FIG. 14 with FIG. 7. Stage 4 is a 9-tap comb filter with a decimation ratio of 5:1 and a frequency response of $$\left[\frac{\sin(x)}{x}\right]^2.$$

The lowpass coefficients are 0.2*(1,2,3,4,5,4,3,2,1). The bandpass filter coefficients are derived from the lowpass coefficients, as discussed above.

The bandpass filter coefficients are downloaded to the ASIC 1120 from the modulator DSP 1100 upon channel reassignment. Both the input data and the filter coefficients are complex. The lowpass filter 3 dB cut-off frequency is 11 kHz (22 kHz two-sided bandwidth)—wide enough to permit real-time AFC tuning without changing the filter characteristics.

Figure 13D:
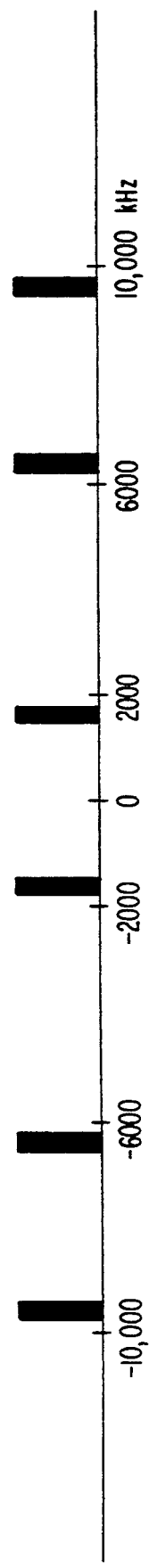

The ASIC 1120 performs complex digital filtering in the first three stages. However, only the real component is computed in the last stage, since the ASIC 1120 only drives a single D/A converter 1130, and the analog IF upconversion is real. Therefore, the resulting spectrum is symmetric about 0 Hz, and mirror-image spectral components at −10, −2, and 6 MHz appear, as shown in FIG. 13(d). It should be noted that, since the sampling rate has been chosen properly, all the aliasing components are nearly equally spaced, and there is a component at the desired IF frequency of approximately 10 MHz (10 MHz plus the channel tuning frequency). Stage 4 of the digital filter computes results rounded to 10 bits of accuracy—enough to drive a suitable D/A converter.

There is one minor complication in the D/A conversion process which the present invention addresses, as now will be discussed. Typically, D/A converters operate with a track-and-hold function which holds each converted sample until the next sample time, $1/f_s$. This causes the analog output spectrum to roll off as $\sin(\pi f/f_s)/(\pi f/f_s)$—a function of the frequency, f. At the desired IF frequency of f=10 MHz and $f_x$=8 MHz, this corresponds to a loss of 15 dB compared to the magnitude of the baseband spectrum. Thus, the signal-to-noise ratio at the D/A converter would be degraded and the higher-level low-frequency aliases must be removed with a higher order analog bandpass filter.

Figure 13E:
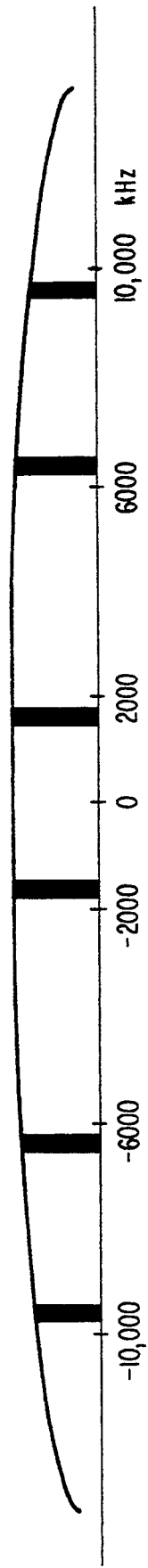
Figure 13F:
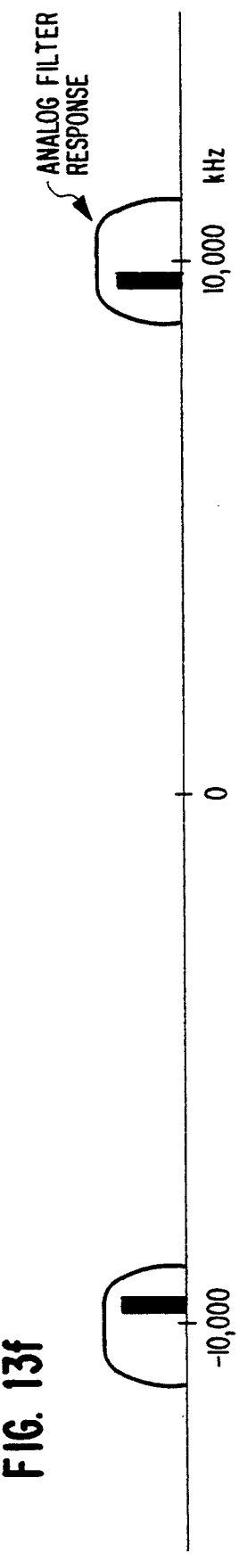

The solution is to increase the sampling rate going to the D/A converter. This is accomplished easily with a digital multiplexer before the D/A converter. As shown in FIG. 11, the D/A converter is clocked at a rate of 16 MHz. As shown in FIG. 14, a multiplexer in the ASIC 1120 alternates between the filter output and the digital codeword corresponding to zero analog volts, and the output is sent to the D/A converter 1130. The zero-padding operation does not alter the locations of each alias component, but it does shorten the D/A aperture sample time by a factor of two. The effect is to broaden the $\sin(\pi f/f_s)/(\pi f/f_x)$ rolloff of the analog spectrum, as shown in FIG. 13(e). The spectrum attenuation is in the range of 5.8 to 7.4 dB across the full 1 MHz channel tuning range. Channel to channel gain variations can easily be compensated by scaling the stage 4 filter coefficients by the appropriate factor in the DSP 1100 before downloading them to the ASIC 1120. A look-up table can be stored in the DSP 1100 for this purpose.

Finally, the D/A converter output is filtered with a 10 MHz analog bandpass filter 1140 (the bandwidth being approximately 1 MHz), and the signal is upconverted in analog upconverter 1160, as discussed previously. The above scheme results in extremely good phase noise characteristics because of the minimum of 84 dB stopband attenuation in the ASIC digital filter. Spurious response is primarily a function of the D/A converter; 10–12 bits are recommended. Such parts, having a 16 MHz speed, am readily available from several manufacturers.

Figure 15:
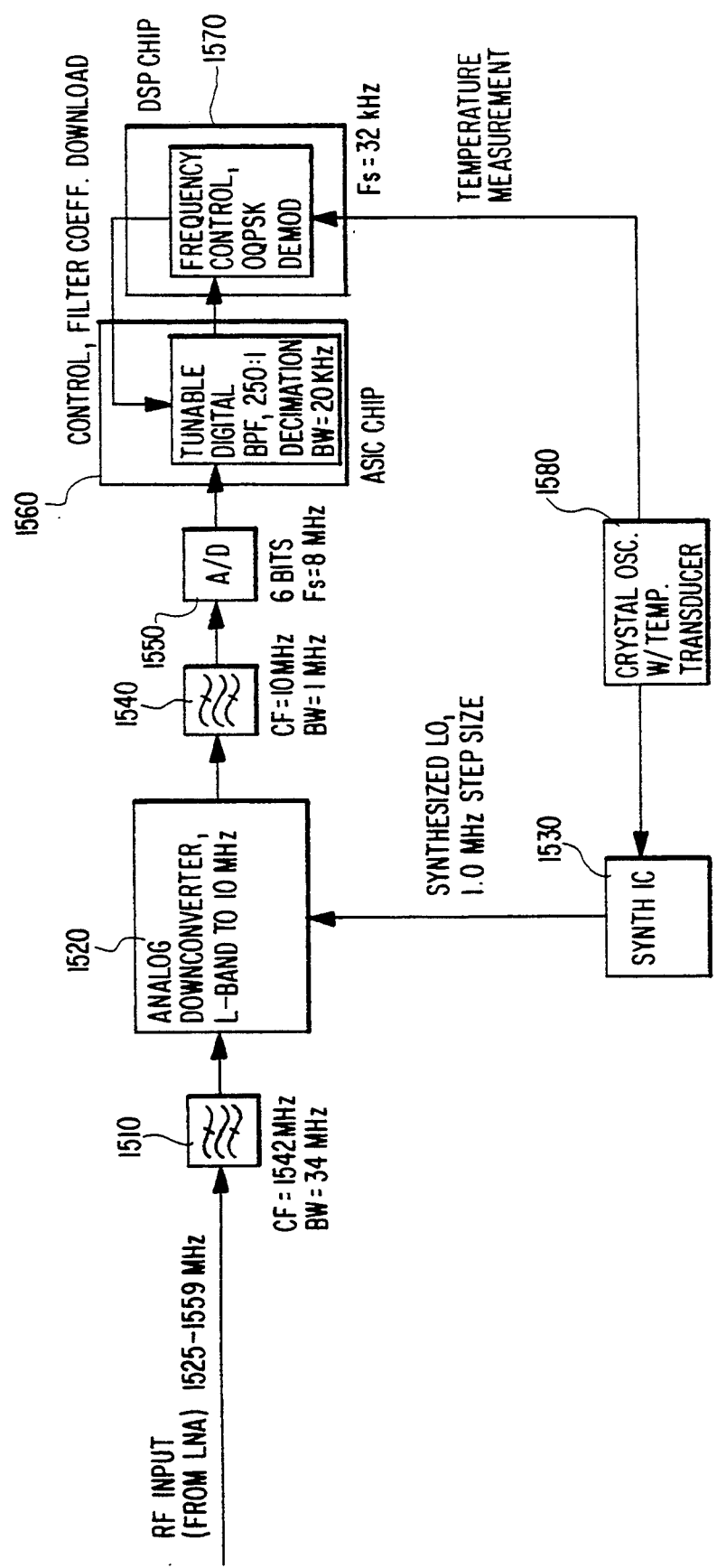
FIG. 15 is a block diagram of a digital downconverter which converts L-band signals to a low IF frequency in accordance with a third embodiment of the invention.

Many variations of the invention also are possible. FIG. 15 shows a receiver scheme with an analog downconversion to a 10 MHz IF, followed by the digital downconverter. An RF input signal from an LNA (not shown) is input to a bandpass filter 1510 which in this preferred embodiment has a center frequency of 1542 MHz and a bandwidth of 34 MHz. The output of filter 1510 is provided to analog downconverter 1520, which converts the filter output from L-band to an IF frequency of 10 MHz in known fashion. Analog downconverter 1520 is controlled in accordance with tuning provided by synthesizer IC 1530 whose output preferably is tuned in 1 MHz steps. Synthesizer IC 1530 obtains its frequency reference from crystal oscillator 1580.

The output of analog downconverter 1520 is provided to an IF bandpass filter 1540 which in the described embodiment has a center frequency of 10 MHz and a bandwidth of 1 MHz. The output of filter 1540 is A/D converted in a six-bit A/D converter 1550; a higher resolution A/D converter than in the FIG. 2 embodiment is necessary because of the lower sampling rate employed. The output of A/D converter 1550 is at a sampling frequency of 8 MHz.

The digital downconverter, comprising ASIC 1560 and DSP 1570, performs the remainder of the tuning steps to 1 Hz resolution. Design of a low phase noise synthesized analog local oscillator is relatively straightforward because of the large frequency step size.

The digital downconverter is virtually identical to that described previously with reference to FIG. 2. For optimum bandpass sampling, a sample rate of 8 MHz is chosen for the 10 MHz IF bandpass center frequency. The IF signal is sampled with 6-bit A/D converter 1550, as was mentioned above. The ASIC 1560 contains a four-stage tunable digital bandpass filter with a sample rate decimation ratio of 250:1. The filter may be tuned to any channel within the 1 MHz IF bandwidth.

Figure 16:
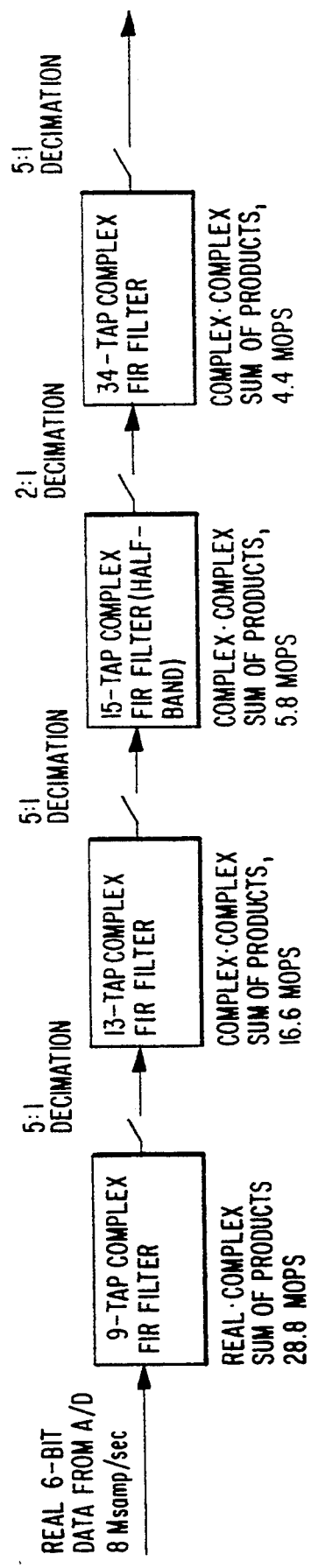
FIG. 16 is a diagram of a digital decimation filter algorithm which operates in accordance with the third embodiment of the invention.

FIG. 16 shows a block diagram of the digital decimation filter, which is similar to that shown in FIG. 7. In fact, stages 2, 3, and 4 in the FIG. 16 filter are identical to those in FIG. 7, but stage 1 now decimates by 5:1 instead of 50:1, as in FIG. 7. The filter is implemented as a conventional sum of products FIR filter using a multiplier accumulator. Coefficients are complex, but input data from the A/D converter is real. The filter is a 9-tap comb filter with a frequency response of $$\left[\frac{\sin(x)}{x}\right]^2.$$

The lowpass coefficients are 0.2*(1,2,3,4,5,4,3,2,1).

Figures 17A, 17B:
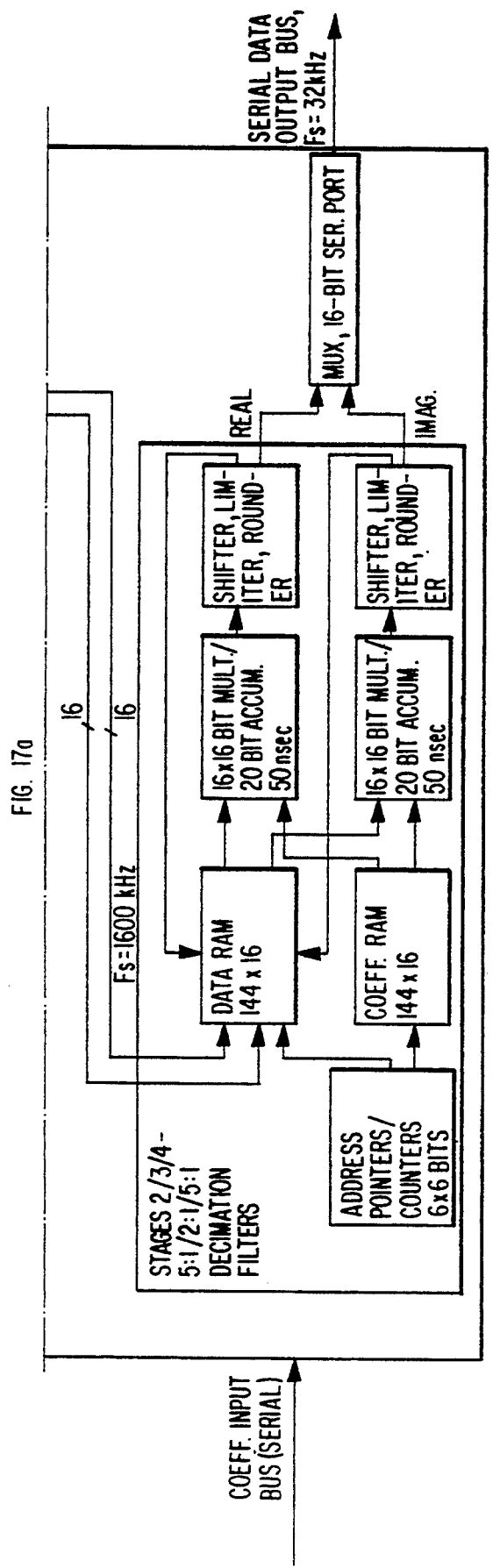
FIG. 17 is a hardware block diagram of the digital decimation filter used in accordance with the third embodiment of the invention, corresponding to the algorithm shown in FIG. 16.

The design of the ASIC 1560 is very similar to that of FIG. 10, except that the stage 1 filter uses two 16×6 bit multiplier accumulators, as seen in FIG. 17, instead of the external SRAM, adders, and accumulators of the FIG. 10 stage 1 filter. Looking at FIG. 17 in more detail, the 6-bit data input from the A/D converter is provided to the two 16×6 bit multiplier accumulators 1702, 1704. Data from respective coefficient RAMs 1712, 1714 are provided to these multiplier accumulators 1702, 1704, based on coefficients downloaded from DSP 1570. The outputs of accumulators 1702, 1704 are provided to respective shifter/limiter/rounders 1722, 1724, the outputs of which are provided to stage 2 of the filter. The constitution of filter stages 2–4 in FIG. 17 is identical to that of FIG. 10, and so need not be described in further detail here. As in the FIG. 10 embodiment, the output of filter stage 4 comprises in-phase and quadrature components, which are provided via a multiplexer in serial fashion to the DSP 1570.

Operation of the DSP 1570 in the FIG. 15 embodiment is identical to that of the DSP of FIG. 3, except for what is downloaded for the operation of the stage 1 filter. The DSP 1570 downloads filter coefficients to the ASIC 1560, performs frequency correction based upon reference oscillator temperature measurements, and performs precise frequency tuning with 1 Hz resolution.

Ideally, for a very compact hardware design capable of both reception and transmission in accordance with the present invention, the ASIC preferably includes circuitry for both transmit and receive functions, and a single DSP performs both modulation and demodulation. The transmitter DSP also includes channel tuning, automatic frequency control, and reference oscillator temperature compensation.

While the invention has been described in detail with reference to a preferred embodiment, various changes and modifications within the scope and spirit of the invention will be apparent to those of working skill in this technological field. Thus, the invention is to be considered as limited only by the scope of the appended claims.

What is claimed is:

1. Apparatus for performing digital frequency conversion and real-time frequency tracking, comprising:
    a bandpass filter for bandpass filtering an input signal at a predetermined bandwidth to provide a bandpass filtered signal;
    an analog-to-digital (A/D) converter for sampling said bandpass filtered signal at a sampling rate related to a center frequency of said bandpass filtered signal to provide a digital sampled signal;
    an uncompensated frequency reference oscillator having an integral temperature transducer;
    a tunable multi-stage digital decimation filter for downconverting said digital sampled signal; and
    a digital signal processor (DSP), receiving temperature measurement values from said temperature transducer, and receiving channel tuning information from the tunable multi-stage digital decimation filter for providing temperature-compensated tuning of said digital sampled signal from a desired channel frequency to baseband at a 1 Hz resolution, wherein phase noise as measured in a 1 Hz bandwidth is at least 33.5 dB down for a 10 Hz offset from baseband, and at least 60.5 dB down for a 100 Hz offset from baseband.

2. Apparatus as claimed in claim 1, wherein said tunable multi-stage digital decimation filter comprises an application specific integrated circuit (ASIC), said apparatus further comprising a random access memory (RAM) which is loaded with filter values from said DSP, and wherein a first stage of said filter is tuned in accordance with said filter values.

3. Apparatus as claimed in claim 1, wherein said tunable multi-stage digital decimation filter comprises an application specific integrated circuit (ASIC), said DSP providing coefficient values to second through fourth stages of said filter, wherein said second through fourth stages are tuned in accordance with said coefficient values.

4. Apparatus as claimed in claim 1, wherein a first stage of said tunable multi-stage decimation filter is a complex finite impulse response (FIR) filter comprising a look-up random access memory (RAM).

5. Apparatus as claimed in claim 4, wherein said RAM comprises a plurality of banks, said RAM being loaded with values from said DSP in accordance with said desired channel frequency, and wherein said first stage of said filter comprises:
    a plurality of latches for simultaneously looking up values in more than one of said banks;
    a first adder for adding a first pair of said values from a first pair of said banks;
    a second adder for adding a second pair of said values from a second pair of said banks;
    a first accumulator for accumulating outputs of said first adder; and
    a second accumulator for accumulating outputs of said second adder.

6. Apparatus as claimed in claim 5, wherein an output of said first accumulator is an in-phase value, and an output of said second accumulator is a quadrature value, said fourth stage of said filter providing further filtered in-phase and quadrature values to said DSP.

7. Apparatus as claimed in claim 1, wherein said tunable multi-stage digital decimation filter comprises an application specific integrated circuit (ASIC), said ASIC receiving digital symbol timing phase control signals from said DSP.

8. Apparatus as claimed in claim 1, wherein said A/D converter comprises a two-bit A/D converter, said sampling being performed at microwave frequencies.

9. Apparatus as claimed in claim 1, wherein said A/D converter comprises a three-bit A/D converter, said sampling being performed at microwave frequencies.

10. Apparatus as claimed in claim 1, wherein said A/D converter performs said sampling in accordance with the following:

$$f_s > 2B$$
$$f_s = \frac{4f_c}{2n + 1}$$

where
B is a two-sided signal bandwidth;
$f_s$ is said sampling rate;
$f_c$ is said center frequency; and
n is a non-negative integer.

11. Apparatus for performing digital frequency conversion and real-time frequency tracking, comprising:
a RF bandpass filter for bandpass filtering an input signal at a first predetermined bandwidth to provide an RF bandpass filtered signal;
an analog downconverter for downconverting said RF bandpass filtered signal to an IF signal;
an IF bandpass filter for bandpass filtering said IF signal at a second predetermined bandwidth to provide an IF bandpass filtered signal;
an analog-to-digital (A/D) converter for sampling said IF bandpass filtered signal at a sampling rate related to a center frequency of said IF bandpass filtered signal to provide a digital sampled signal;
an uncompensated frequency reference oscillator having an integral temperature transducer;
a tunable multi-stage digital decimation filter for downconverting said digital sampled signal; and
a digital signal processor (DSP), receiving temperature measurement values from said temperature transducer, and receiving channel tuning information from the tunable multi-stage digital decimation filter, for providing temperature-compensated tuning of said digital sampled signal from a desired channel frequency to baseband at a 1 Hz resolution, wherein phase noise as measured in a 1 Hz bandwidth is at least 33.5 dB down for a 10 Hz offset from baseband, and at least 60.5 dB down for a 100 Hz offset from baseband.

12. Apparatus as claimed in claim 11, wherein said A/D converter comprises a six-bit A/D converter.

13. Apparatus as claimed in claim 11, wherein said tunable multi-stage digital decimation filter comprises an application specific integrated circuit (ASIC), said DSP providing coefficient values to first through fourth stages of said filter, wherein said first through fourth stages are tuned in accordance with said coefficient values.

14. Apparatus as claimed in claim 11, wherein said tunable multi-stage digital decimation filter comprises an application specific integrated circuit (ASIC), said ASIC receiving digital symbol timing phase control signals from said DSP.

15. Apparatus for performing digital frequency conversion and real-time frequency tracking, comprising:
an uncompensated frequency reference oscillator having an integral temperature transducer;
a digital signal processor (DSP), receiving temperature measurement values from said temperature transducer, channel tuning information, and a baseband modulated digital signal having in-phase and quadrature components, for providing temperature-compensated tuning of said baseband modulated digital signal from baseband to a desired intermediate frequency to provide a first digital intermediate frequency signal, having in-phase and quadrature components, at a 1 Hz resolution, wherein phase noise as measured in a 1 Hz bandwidth is at least 42 dB down for a 10 Hz offset from baseband, and at least 65 dB down for a 100 Hz offset from baseband;
a tunable multi-stage digital interpolation filter for upconverting said first digital intermediate frequency signal to provide a second digital intermediate frequency signal;
a digital-to-analog (D/A) converter for receiving said second digital intermediate frequency signal and outputting an analog intermediate frequency signal;
an analog bandpass filter for bandpass filtering said analog intermediate frequency signal to provide a bandpass filtered signal; and
an analog upconverter, receiving said bandpass filtered signal and a local oscillator signal related to an output of said uncompensated reference oscillator, for upconverting said bandpass filtered signal to provide an RF signal.

16. Apparatus as claimed in claim 15, further comprising a synthesizer, tunable in 1 MHz frequency, and receiving said output of said uncompensated reference oscillator, for providing said local oscillator to said analog upconverter.

17. Apparatus as claimed in claim 15, wherein said D/A converter is a 10-bit D/A converter.

18. Apparatus as claimed in claim 15, wherein said tunable multi-stage digital interpolation filter comprises an application specific integrated circuit (ASIC), said DSP providing coefficient values to first through fourth stages of said filter, wherein said first through fourth stages are tuned in accordance with said coefficient values.

19. Apparatus as claimed in claim 18, further comprising a multiplexer receiving an output of said fourth stage of said filter, and zero padding information, said multiplexer outputting said second digital intermediate frequency signal.

* * * * *